United States Patent
Stilson

(10) Patent No.: US 11,835,073 B2
(45) Date of Patent: Dec. 5, 2023

(54) CLAMPING DEVICE

(71) Applicant: Coulter Ventures, LLC., Columbus, OH (US)

(72) Inventor: Tyler Scott Stilson, Frederick, CO (US)

(73) Assignee: Coulter Ventures, LLC., Columbus, OH (US)

( * ) Notice: Subject to any disclaimer, the term of this patent is extended or adjusted under 35 U.S.C. 154(b) by 451 days.

(21) Appl. No.: 16/919,842

(22) Filed: Jul. 2, 2020

(65) Prior Publication Data

US 2021/0001165 A1     Jan. 7, 2021

Related U.S. Application Data

(60) Provisional application No. 62/869,765, filed on Jul. 2, 2019.

(51) Int. Cl.
| | |
|---|---|
| *F16B 2/08* | (2006.01) |
| *F16B 2/18* | (2006.01) |
| *A63B 21/072* | (2006.01) |

(52) U.S. Cl.
CPC .......... *F16B 2/185* (2013.01); *A63B 21/0728* (2013.01); *F16B 2/08* (2013.01)

(58) Field of Classification Search
CPC ......... F16B 2/08; F16B 2/185; A63B 21/0728
See application file for complete search history.

(56) References Cited

U.S. PATENT DOCUMENTS

| | | | |
|---|---|---|---|
| 2,274,872 A | 3/1942 | Smith, Jr. | |
| 3,113,791 A | 12/1963 | Frost et al. | |
| 4,579,337 A * | 4/1986 | Uyeda ................ | A63B 21/0728 403/259 |

(Continued)

FOREIGN PATENT DOCUMENTS

| | | |
|---|---|---|
| DE | 802496 C | 2/1951 |
| FR | 688355 A | 8/1930 |

(Continued)

OTHER PUBLICATIONS

"Collars—Rogue HG 2.0 Collars", Jul. 3, 2017, roguefitness.com via archive.org, site visited Sep. 10, 2021: https://web.archive.org/web/20170703192542/https://www.roguefitness.com/weightlifting-bars-plates/collars (Year: 2017).

*Primary Examiner* — Michael P Ferguson
(74) *Attorney, Agent, or Firm* — Banner & Witcoff, Ltd.

(57) ABSTRACT

A clamping device includes a primary member, a clamping member configured for selectively clamping the primary member to a mounting member, and an engagement mechanism configured to engage an exterior surface proximate to the front side of the primary member. The engagement mechanism may include an abutment member for abutting the surface, an input member for user manipulation, and a linkage between the input member and the abutment member to effect axial movement of the abutment member by the input member. An actuator mechanism for locking and unlocking the clamping member may also be included. The clamping device may be in the form of a barbell clamp in one configuration, which is configured for mounting on a mounting member in the form of a barbell and engaging a weight plate that defines the exterior surface.

29 Claims, 17 Drawing Sheets

(56) References Cited

U.S. PATENT DOCUMENTS

| | | | |
|---|---|---|---|
| 4,646,398 A | 3/1987 | Myhrman | |
| 4,787,629 A * | 11/1988 | DeMyer | A63B 21/0728 403/261 |
| 4,893,810 A * | 1/1990 | Lee | A63B 21/0728 24/115 L |
| 5,062,631 A * | 11/1991 | Dau | A63B 21/0728 403/330 |
| 5,295,934 A * | 3/1994 | Collins | A63B 21/0728 482/107 |
| D550,075 S | 9/2007 | Tung | |
| 7,513,856 B2 | 4/2009 | Jones | |
| 7,811,213 B2 * | 10/2010 | Chen | A63B 21/0728 482/107 |
| 3,827,878 A1 | 9/2014 | Ciminski et al. | |
| 9,764,183 B2 | 9/2017 | Roepke | |
| 10,226,659 B2 | 3/2019 | Stilson | |
| 10,953,263 B2 | 3/2021 | Stilson | |
| D919,422 S | 5/2021 | Stilson | |
| D939,336 S | 12/2021 | Svengalis | |
| D941,408 S | 1/2022 | Jones | |
| D971,720 S | 12/2022 | Jones | |
| D972,056 S | 12/2022 | Jones | |
| 11,565,143 B2 | 1/2023 | Jones | |
| D979,677 S | 2/2023 | Liu | |
| 2008/0287271 A1 | 11/2008 | Jones | |
| 2017/0095688 A1 | 4/2017 | Stilson | |
| 2018/0185696 A1 | 7/2018 | Stilson | |
| 2018/0326251 A1 | 11/2018 | Stilson | |
| 2019/0105525 A1 | 4/2019 | Stilson | |
| 2020/0171339 A1 | 6/2020 | Jones | |
| 2021/0001165 A1 | 1/2021 | Stilson | |
| 2021/0001166 A1 | 1/2021 | Stilson | |
| 2022/0143453 A1 | 5/2022 | Martin | |

FOREIGN PATENT DOCUMENTS

| | | |
|---|---|---|
| FR | 1116144 A | 5/1956 |
| FR | 1219395 A | 5/1960 |
| KR | 1993-0001671 Y1 | 4/1993 |
| KR | 20130119206 A | 10/2013 |
| WO | 2005082221 A1 | 9/2005 |

* cited by examiner

CLAMPING DEVICE

CROSS-REFERENCE TO RELATED APPLICATION

This application is a non-provisional of, and claims priority to, U.S. Provisional Application No. 62/869,765, filed Jul. 2, 2019, which prior application is incorporated by reference herein in its entirety.

FIELD OF THE INVENTION

This disclosure relates to clamping devices, and more specifically to clamping devices in the form of barbell clamps or other clamps designed to secure weights on exercise equipment.

BRIEF SUMMARY

General aspects of the present disclosure relate to a clamping device that includes a primary member, a clamping member configured for selectively clamping the primary member to a mounting member, and an engagement mechanism configured to engage an exterior surface proximate to the front side of the primary member. The clamping device may be in the form of a barbell clamp in one configuration, which is configured for mounting on a mounting member in the form of a barbell and engaging a weight plate that defines the exterior surface.

Aspects of the disclosure relate to a clamping device that includes a primary member including a cylindrical body having a front side and a rear side, with a central passage extending in an axial direction from the front side to the rear side and configured for receiving a mounting member therethrough, a clamping member connected to the primary member and configured for selectively engaging the mounting member when the mounting member is received in the central passage, an actuator mechanism engaged with the clamping member, and an engagement mechanism configured to engage a surface adjacent to the front side of the primary member. The primary member has a plurality of passages positioned around the central passage, the passages extending through the body in the axial direction from the front side to the rear side. The actuator mechanism is configured to be moveable between an unlocked position, where the clamping member does not securely engage the mounting member to permit the mounting member to be removed from the central passage, and a locked position, where the actuator mechanism moves the clamping member to securely engage the mounting member to resist movement of the primary member with respect to the mounting member. The engagement mechanism includes an abutment member positioned at the front side of the primary member and configured to move along the axial direction with respect to the primary member and to abut the surface, an input member threadably engaged with the primary member and positioned at the rear side of the primary member, and a plurality of linkages extending in the axial directions through the plurality of passages, the linkages operably engaging the abutment member and the input member. The input member is configured to move along the axial direction with respect to the primary member by rotation with respect to the primary member. Movement of the input member along the axial direction by rotation is configured to move the linkages in the axial direction to drive movement of the abutment member in the axial direction toward the surface.

According to one aspect, the input member includes a body having an opening configured to receive the mounting member therethrough, with the body having a cylindrical wall defining a receiver that receives the rear side of the primary member. An inner surface of the wall and an outer surface of the primary member have complementary threading to threadably engage the input member with the primary member.

According to another aspect, the clamping device includes a plurality of springs, each of the springs engaging one of the plurality of linkages to bias the linkages in the axial direction toward the rear side of the primary member, such that the abutment member is biased in the axial direction by engagement with the linkages.

According to a further aspect, the input member is rotatable with respect to the primary member, and the engagement mechanism further includes a contact member engaging the linkages and a thrust bearing engaging the contact member and the input member. Rotational movement of the input member is configured to drive axial movement of the linkages through the thrust bearing and the contact member.

According to yet another aspect, the abutment member includes an abutment surface configured to abut the surface, the abutment surface having an opening configured to receive the mounting member therethrough, and a wall extending from the abutment surface toward the rear side of the primary member to define a cup-shape receiving the front side of the primary member.

According to a still further aspect, the clamping member includes a substantially annular body that extends from a first end peripherally around the central passage of the primary member to a second end. The actuator mechanism is configured to engage the clamping member to move the first and second ends closer together in the locked position and farther apart in the unlocked position.

Additional aspects of the disclosure relate to a clamping device that includes a primary member including a body having a front side and a rear side, with a central passage extending in an axial direction from the front side to the rear side and configured for receiving a mounting member therethrough, a clamping member connected to the primary member and configured for selectively engaging the mounting member when the mounting member is received in the central passage, an actuator mechanism engaged with the clamping member, and an engagement mechanism configured to engage a surface adjacent to the front side of the primary member. The actuator mechanism is moveable between an unlocked position, where the clamping member does not securely engage the mounting member to permit the mounting member to be removed from the central passage, and a locked position, where the actuator mechanism moves the clamping member to securely engage the mounting member to resist movement of the primary member with respect to the mounting member. The engagement mechanism includes an abutment member positioned at the front side of the primary member and configured to move along the axial direction with respect to the primary member and to abut the surface, an input member moveably engaged with the primary member and positioned at the rear side of the primary member, and a linkage operably engaging the abutment member and the input member. The input member is configured to be manipulated by a user to move the linkage in the axial direction to drive movement of the abutment member in the axial direction toward the surface.

According to one aspect, the input member is threadably engaged with the primary member, such that the input member is moveable in the axial direction by rotating with respect to the primary member. In one configuration, the input member includes a body having an opening configured to receive the mounting member therethrough, the body having a cylindrical wall defining a receiver that receives the rear side of the primary member. An inner surface of the wall and an outer surface of the primary member have complementary threading to threadably engage the input member with the primary member.

According to another aspect, the clamping device also includes a biasing member engaged with the engagement mechanism and configured to bias the abutment member in the axial direction toward the rear side of the primary member. In one configuration, the biasing member includes a spring engaging the linkage to bias the linkage in the axial direction toward the rear side of the primary member, such that the abutment member is biased in the axial direction by engagement with the linkage.

According to a further aspect, the linkage extends through a passage extending through the body of the primary member in the axial direction.

According to yet another aspect, the clamping device further includes a plurality of linkages, including the linkage, each of the plurality of linkages operably engaging the abutment member and the input member. The input member is configured to be manipulated by the user to move the plurality of linkages in the axial direction to drive movement of the abutment member in the axial direction toward the surface.

According to a still further aspect, the input member is rotatable with respect to the primary member, and the engagement mechanism further includes a contact member engaging the linkage and a thrust bearing engaging the contact member and the input member, where rotational movement of the input member is configured to drive axial movement of the linkage through the thrust bearing and the contact member.

According to an additional aspect, the abutment member includes an abutment surface configured to abut the surface, the abutment surface having an opening configured to receive the mounting member therethrough, and a wall extending from the abutment surface toward the rear side of the primary member to define a cup-shape receiving the front side of the primary member.

According to another aspect, the clamping member includes a substantially annular body that extends from a first end peripherally around the central passage of the primary member to a second end, and the actuator mechanism is configured to engage the clamping member to move the first and second ends closer together in the locked position and farther apart in the unlocked position.

Further aspects of the disclosure relate to a clamping device including a primary member comprising a body having a central passage extending in an axial direction and configured for receiving a mounting member therethrough, a clamping member connected to the primary member and configured for selectively engaging the mounting member when the mounting member is received in the central passage, and an engagement mechanism configured to engage a surface adjacent to the primary member. The engagement mechanism includes an abutment member positioned at a front side of the primary member and configured to move along the axial direction with respect to the primary member and to abut the surface, an input member threadably engaged with the primary member and spaced from the abutment member in the axial direction, and a linkage operably engaging the abutment member and the input member and extending in the axial direction. The input member is configured to move along the axial direction with respect to the primary member by rotation with respect to the primary member. Movement of the input member along the axial direction by rotation is configured to move the linkage in the axial direction to drive movement of the abutment member in the axial direction toward the surface.

According to one aspect, the input member includes a body having an opening configured to receive the mounting member therethrough, with the body having a cylindrical wall defining a receiver that receives a portion of the primary member. An inner surface of the wall and an outer surface of the primary member have complementary threading to threadably engage the input member with the primary member.

According to another aspect, the clamping device further includes a biasing member engaged with the engagement mechanism and configured to bias the abutment member in the axial direction toward the front side of the primary member.

According to a further aspect, the linkage extends through a passage extending through the body of the primary member in the axial direction. In one configuration, the input member is positioned at a rear side of the body opposite the front side, and the passage extends completely through the body of the primary member, from the front side to the rear side.

According to yet another aspect, the clamping device further includes a plurality of linkages, including the linkage, each of the plurality of linkages operably engaging the abutment member and the input member. Movement of the input member along the axial direction by rotation is configured to move the plurality of linkages in the axial direction to drive movement of the abutment member in the axial direction toward the surface.

According to a still further aspect, the engagement mechanism further includes a contact member engaging the linkage and a thrust bearing engaging the contact member and the input member, where rotational movement of the input member is configured to drive axial movement of the linkage through the thrust bearing and the contact member.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which.

DETAILED DESCRIPTION

Figure 1:
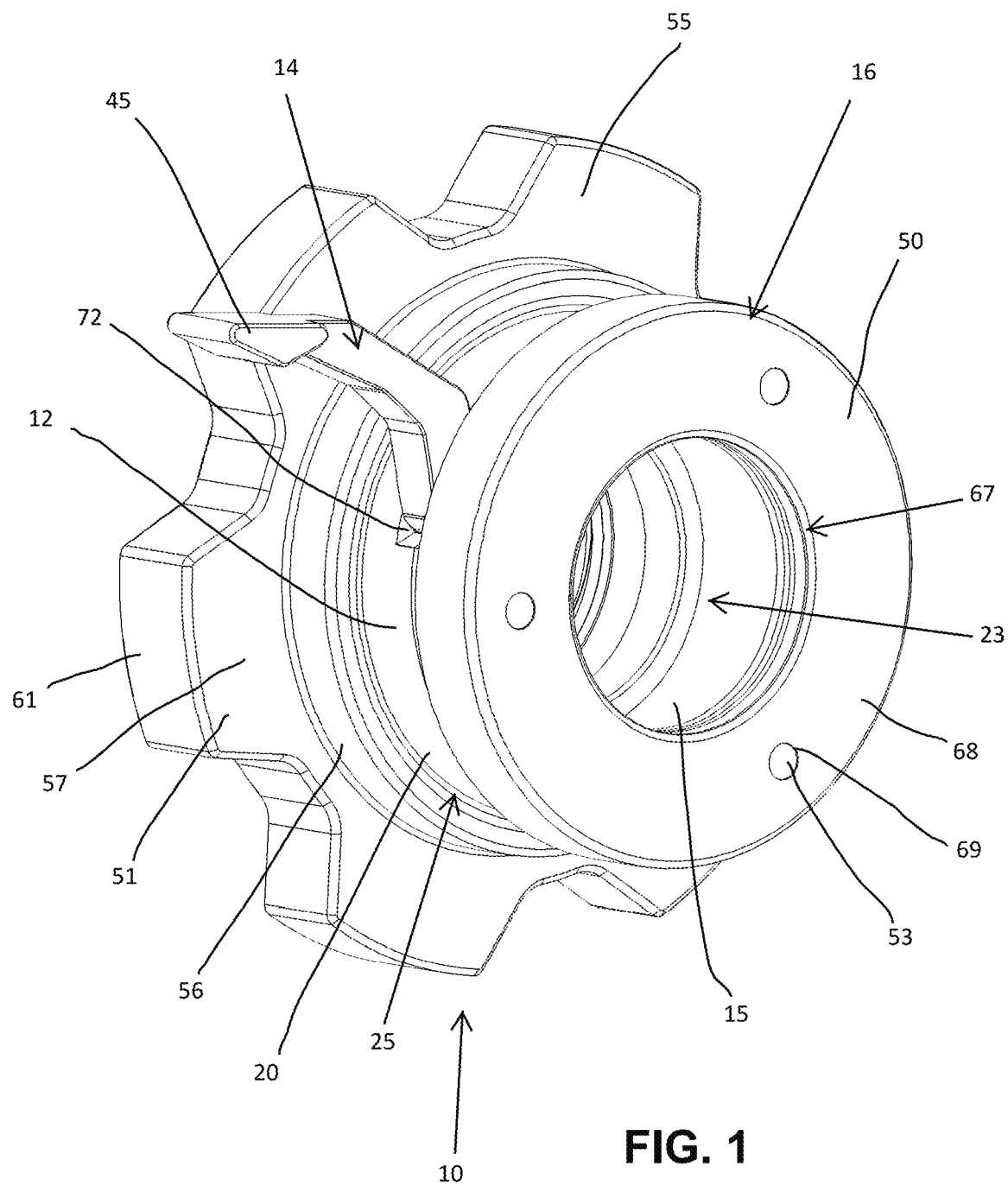
FIG. 1 is a front perspective view of one embodiment of a clamping device according to aspects of the disclosure, with an actuator mechanism of the clamping device shown in an unlocked position.
Figure 2:
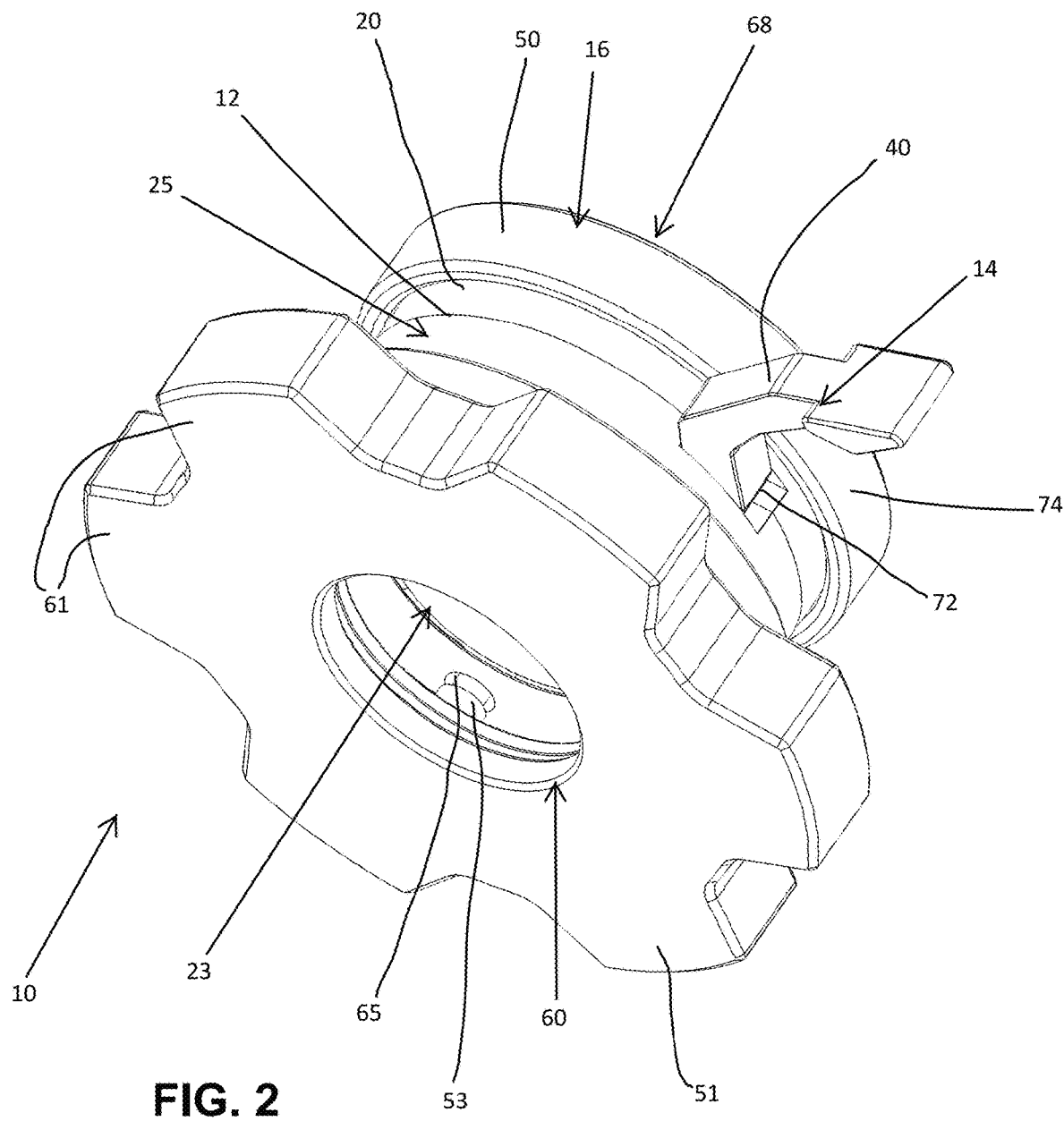
FIG. 2 is a rear perspective view of the clamping device of FIG. 1 with the actuator mechanism shown in the unlocked position.
Figure 3:
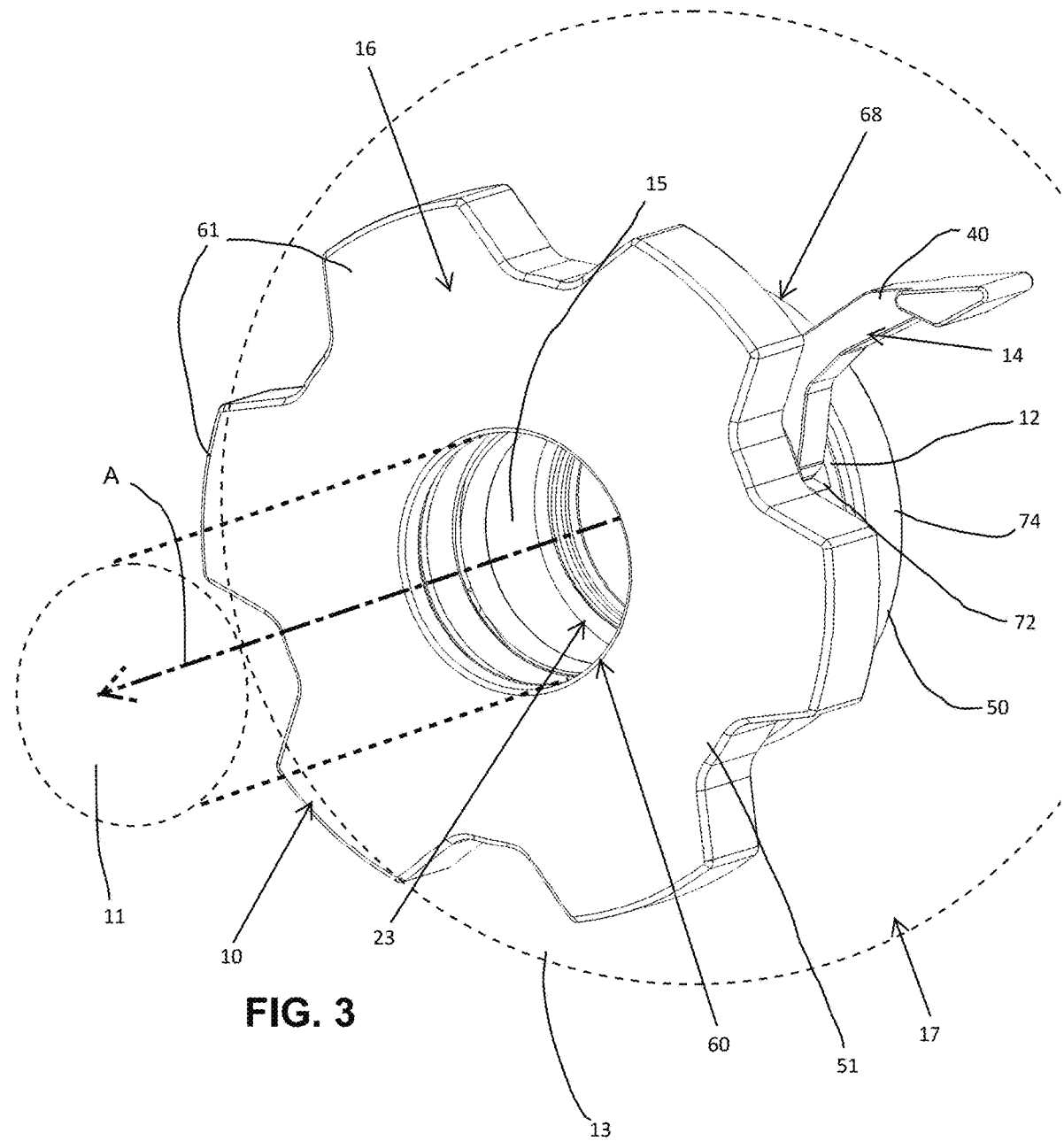
FIG. 3 is a rear perspective view of the clamping device of FIG. 1 with the actuator mechanism shown in the unlocked position, and with the clamping device mounted on a mounting member in the form of a barbell with a weight plate having a surface confronting the clamping device.
Figure 4:
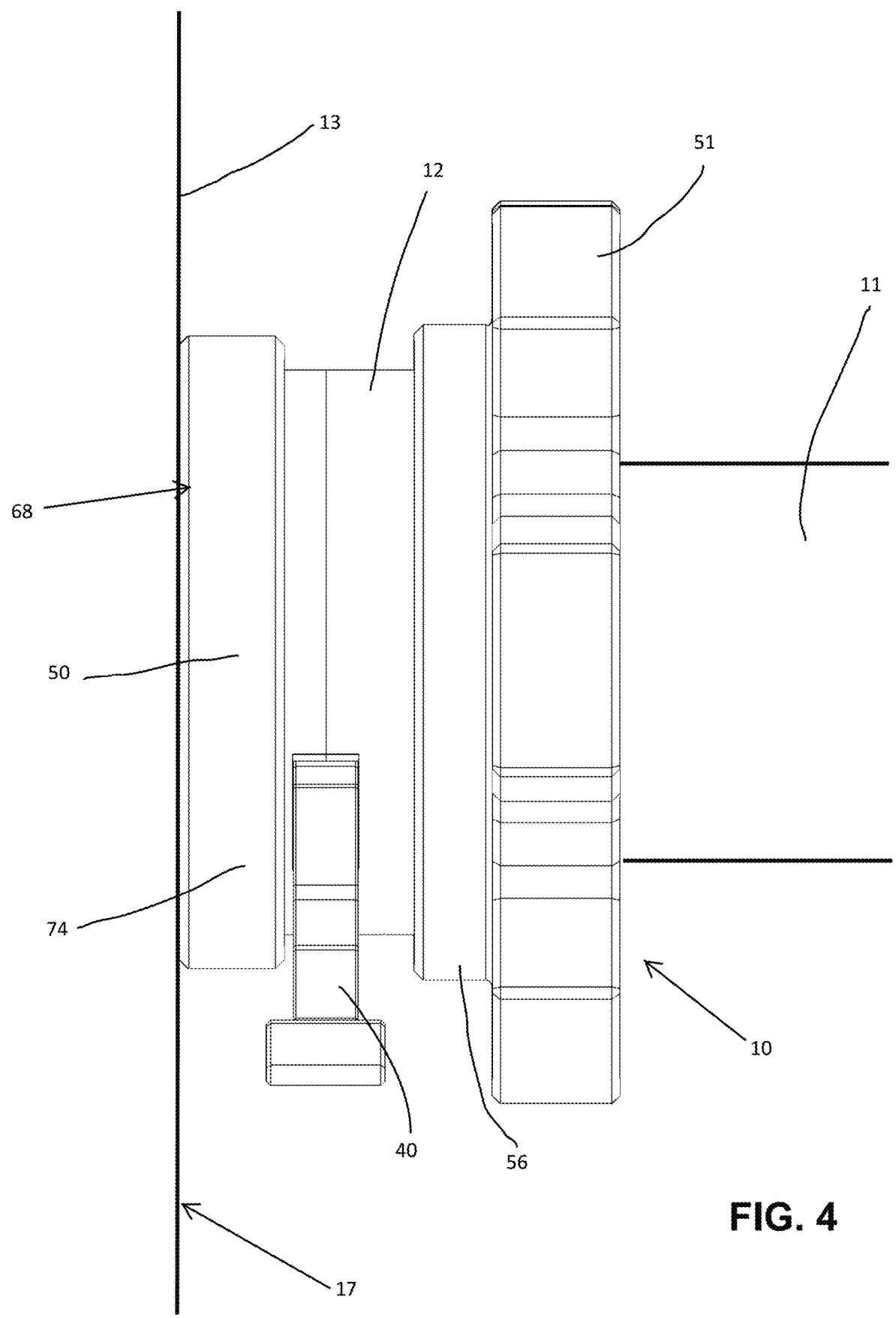
FIG. 4 is a top view of the clamping device, the barbell, and the weight plate of FIG. 3 with the actuator mechanism shown in the unlocked position.
Figure 5:
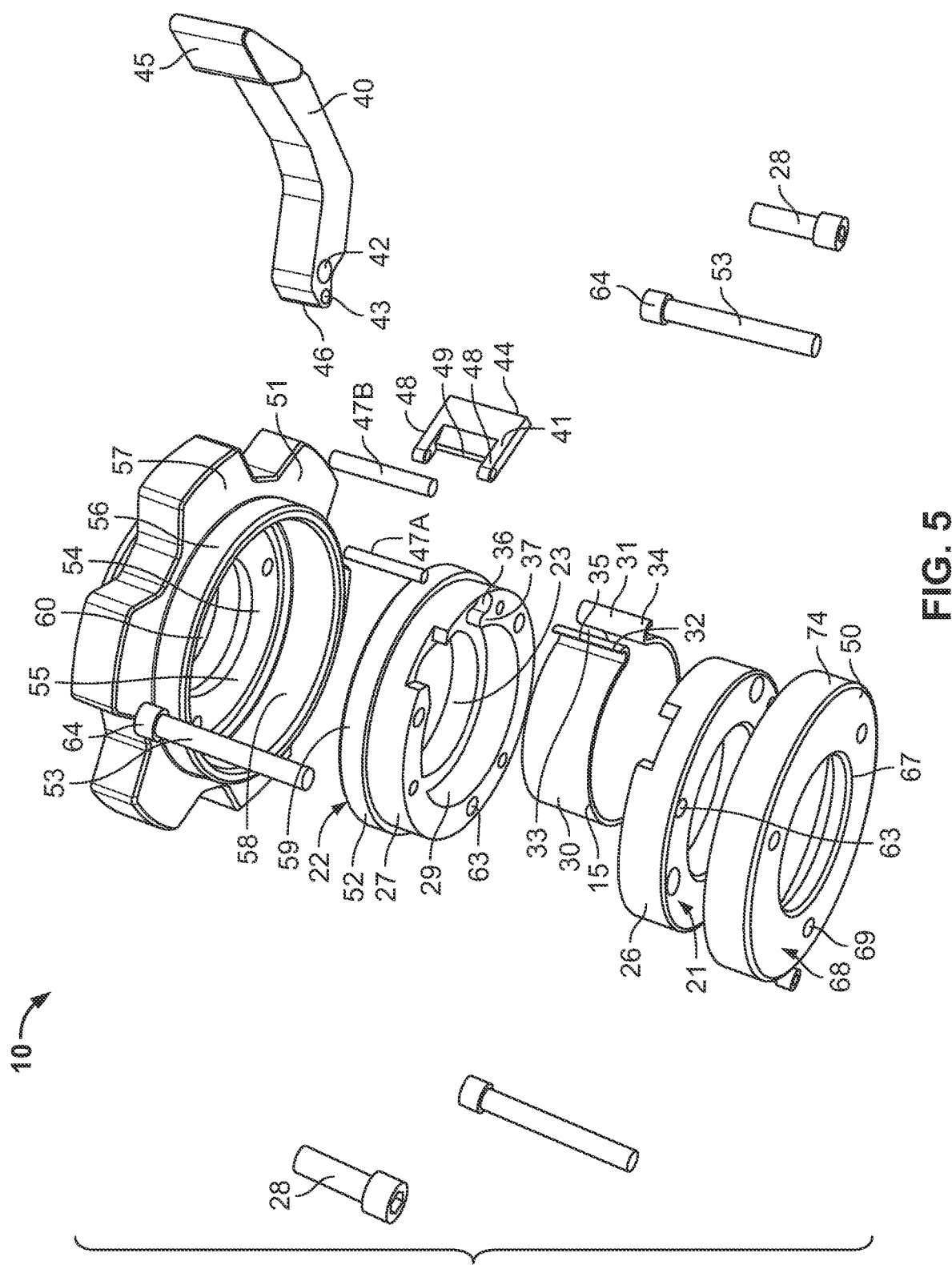
FIG. 5 is an exploded view of the clamping device of FIG. 1.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Figure 6:
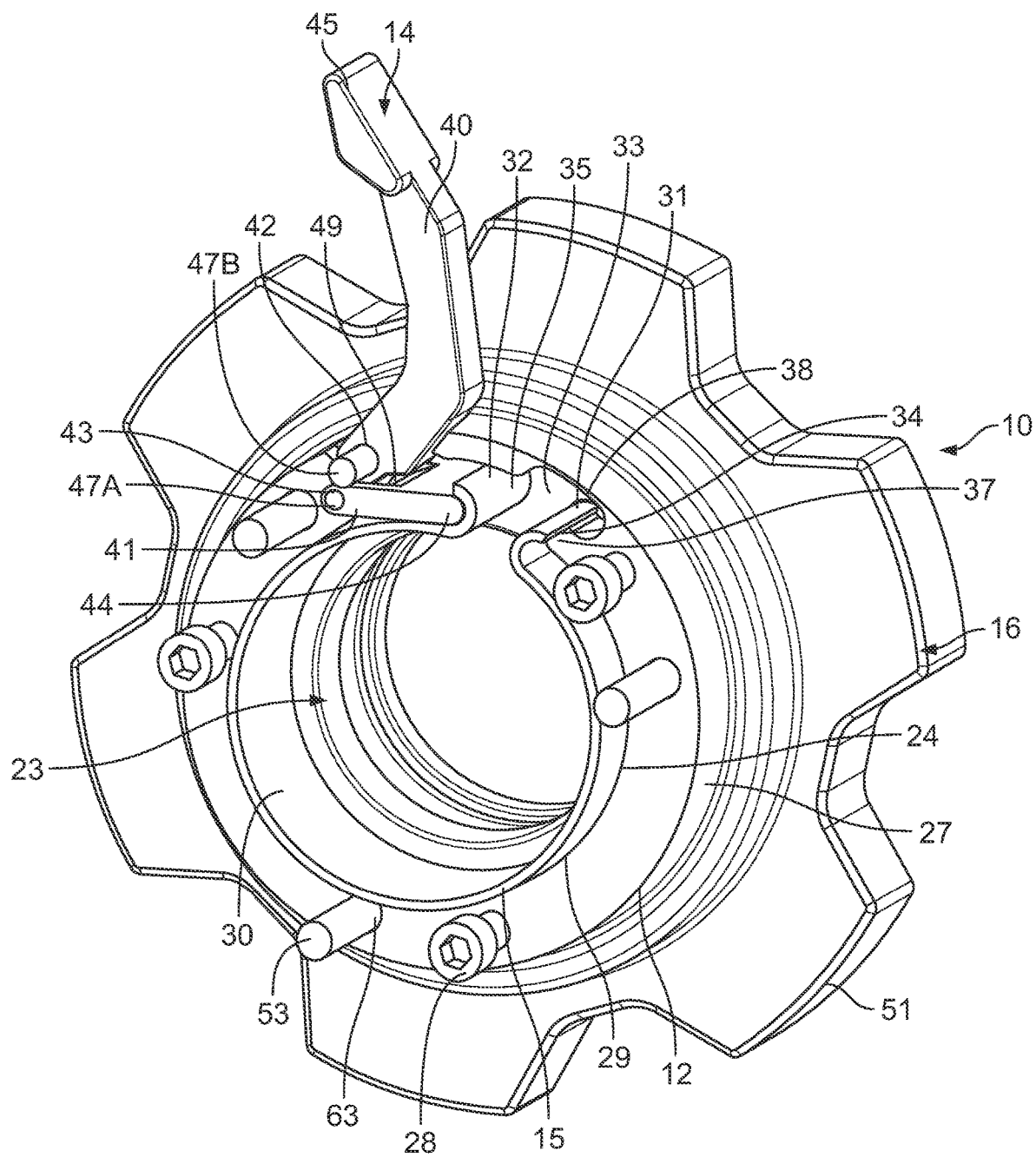
FIG. 6 is a partially cut-away front view of the clamping device of FIG. 1 with the actuator mechanism shown in the unlocked position.
Figure 7:
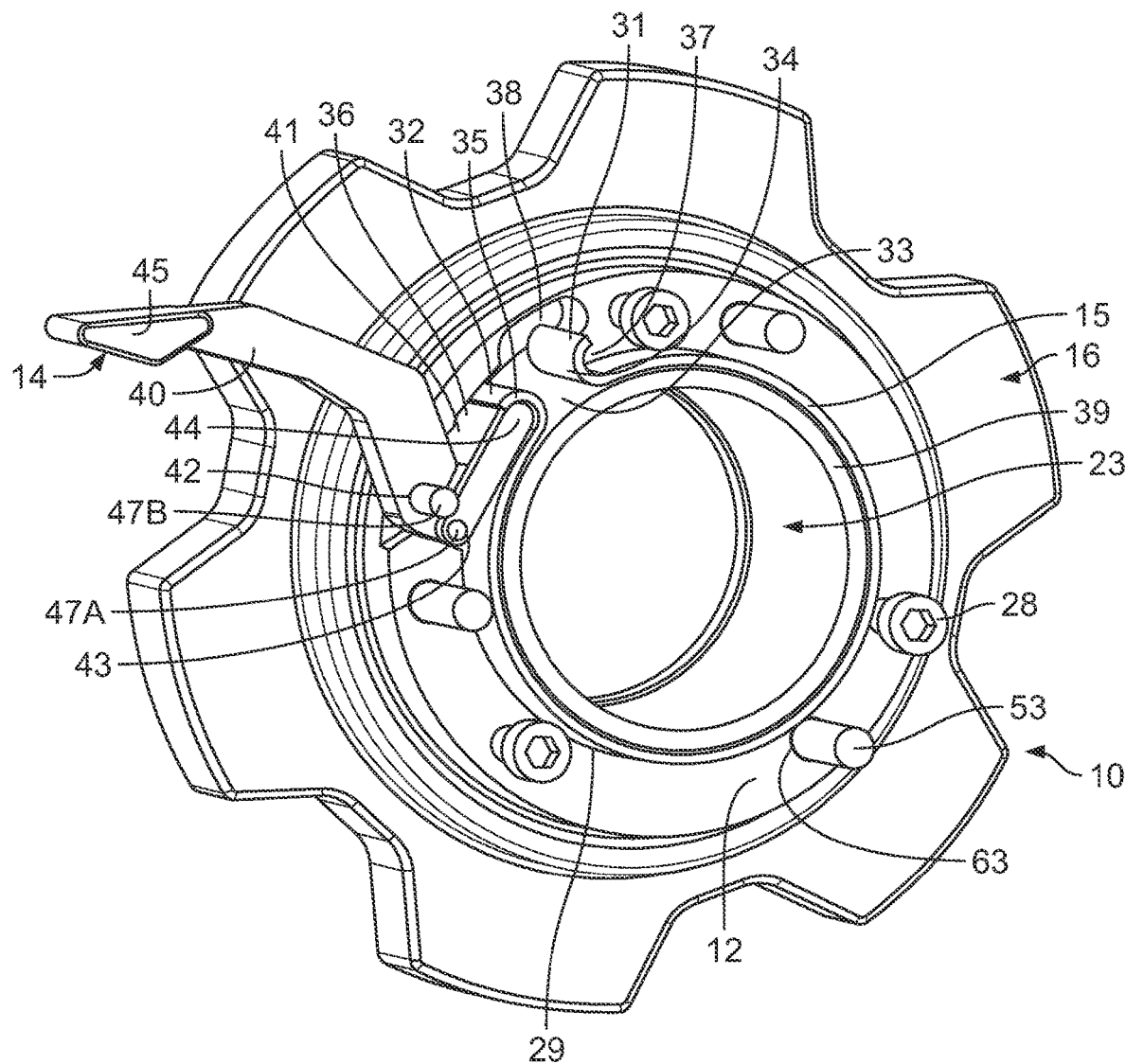
FIG. 7 is a partially cut-away view of the clamping device of FIG. 1 with the actuator mechanism shown in the unlocked position, and further including a gripping member.
Figure 8:
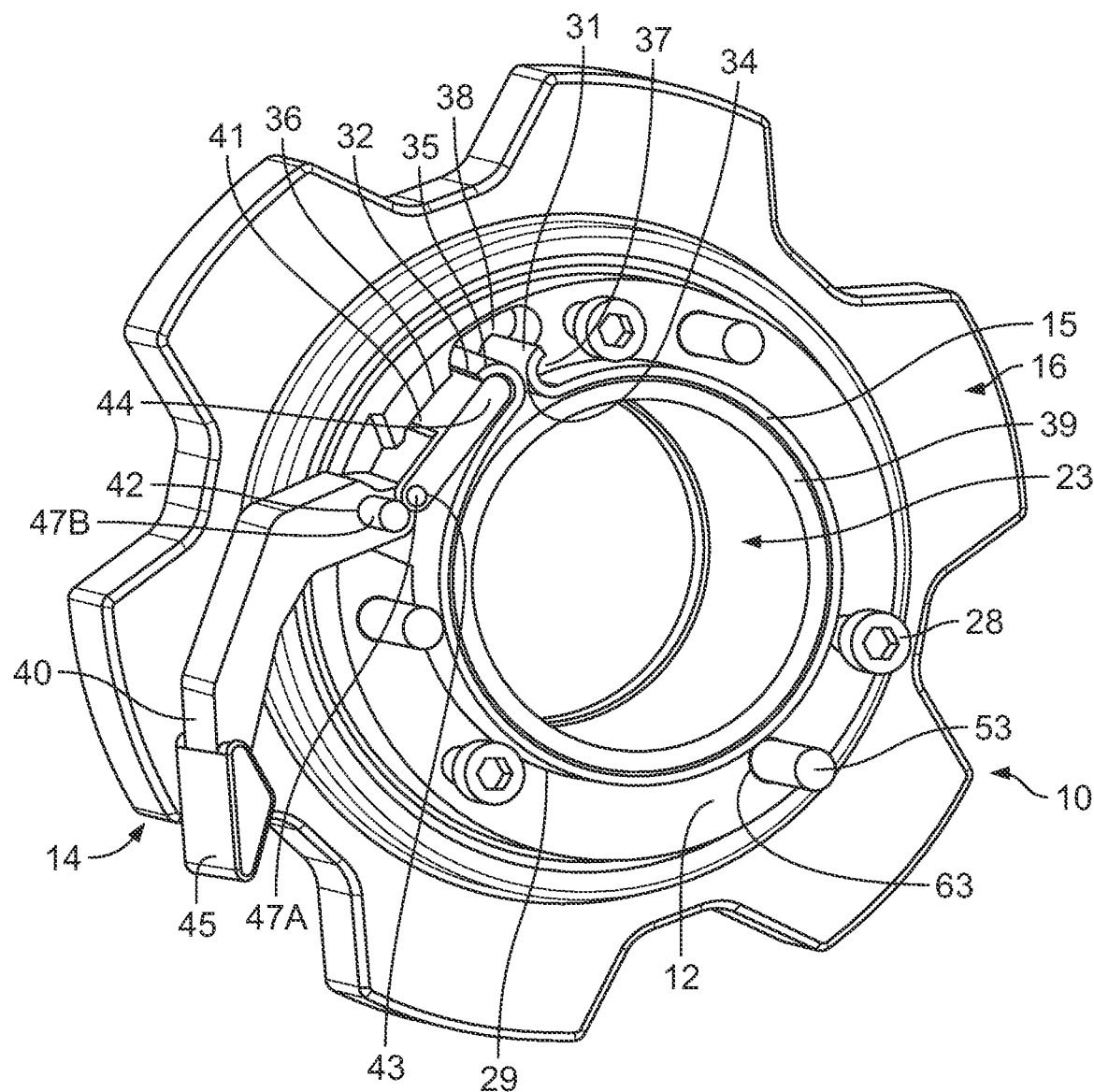
FIG. 8 is a partially cut-away view of the clamping device of FIG. 7 with the actuator mechanism shown in a locked position.
Figure 9:
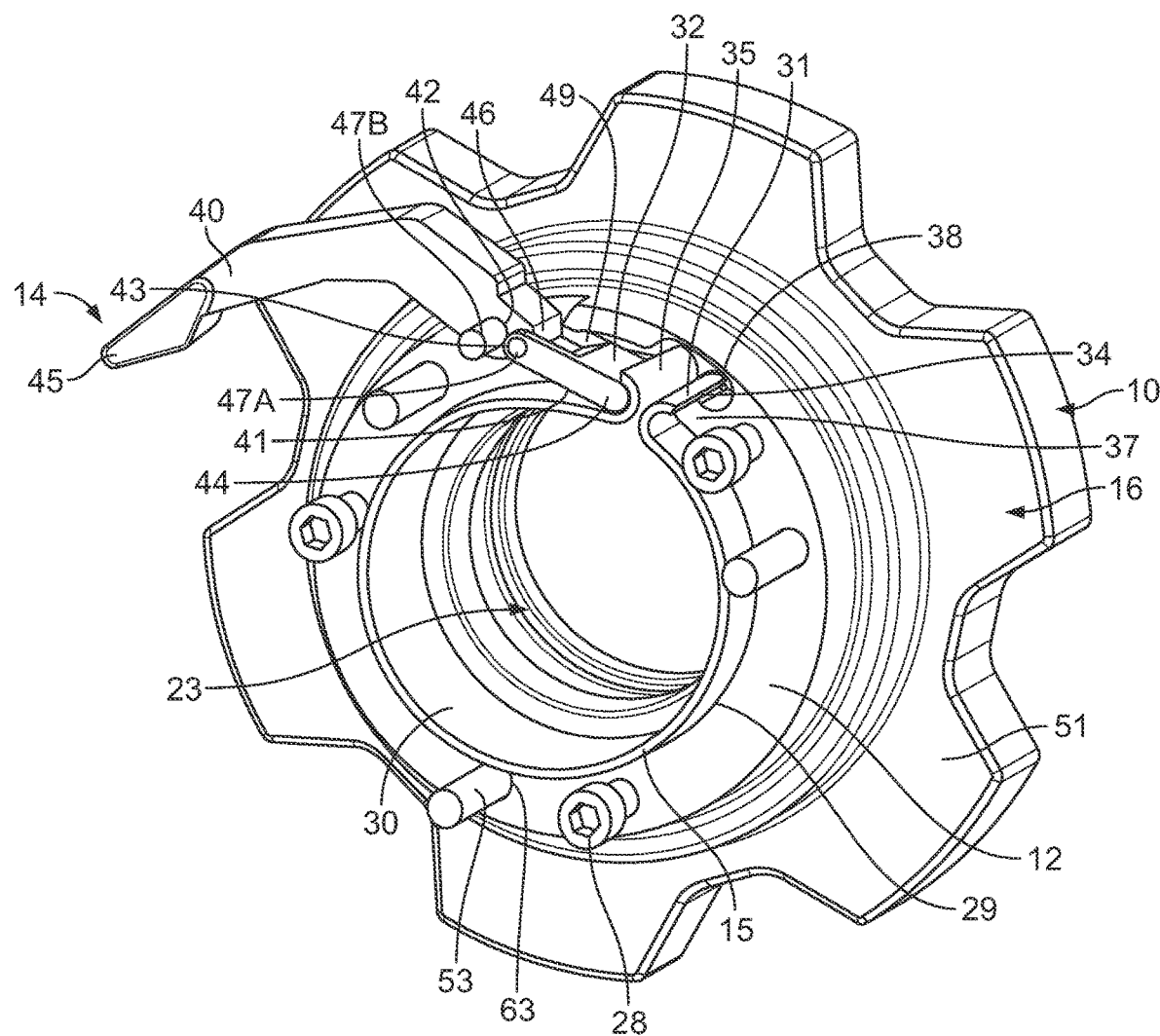
FIG. 9 is a partially cut-away view of the clamping device of FIG. 1 with the actuator mechanism shown in the locked position.
Figure 10:
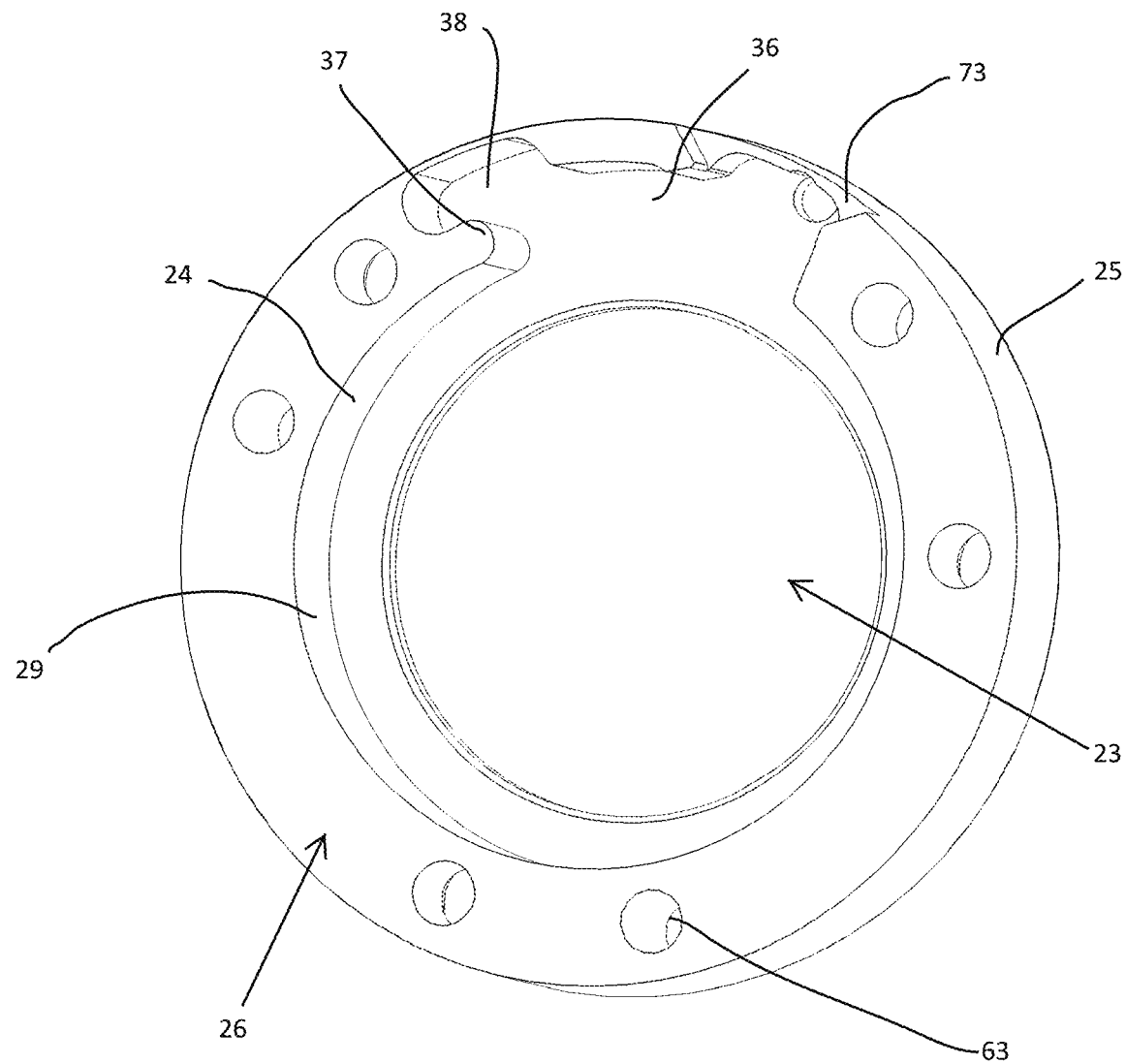
FIG. 10 is a rear perspective view of a first piece of a primary member of the clamping device of FIG. 1.

FIGS. 1-17 illustrate one embodiment of a clamping device 10 according to aspects of the disclosure, which is designed to be connected to an elongated, cylindrical mounting member 11. The clamping device 10 in this embodiment is configured for securing one or more weights 13 to the mounting member 11 (see FIGS. 3-4), and the clamping device 10 may be provided in the form of a barbell clamp configured for connection to a mounting member 11 in the form of a barbell. The clamping device 10 in one embodiment includes at least a primary member 12, a clamping member 15 connected to the primary member, and an actuator mechanism 14 configured to engage the clamping member 15 and be moveable between at least a locked position, where the clamping member 15 is configured to be securely engaged with the mounting member 11, and an unlocked position, where the clamping member 15 is configured to not be securely engaged with the mounting member 11 and can be removed from the mounting member 11. FIGS. 1-7 and 16-17 illustrate the clamping device 10 with the actuator mechanism 14 in the unlocked position, and FIGS. 8-9 illustrate the clamping device 10 with the actuator mechanism 14 in the locked position. The clamping device 10 in FIGS. 1-17 also includes an engagement mechanism 16 configured to engage a surface 17 adjacent to the position of the clamping device 10 on the mounting member 11 (e.g., the side of one or more of the weight(s) 13). The engagement between the engagement mechanism 16 and the surface 17 secures the surface 17 against movement with respect to the clamping device 10. The surface 17 may be substantially vertical and/or substantially perpendicular to the axis of elongation of the mounting member 11 in certain configurations. Additionally, the surface 17 may be a surface of a structure mounted on the mounting member 11, such as a weight or weights 13.

The primary member 12 in the embodiment of FIGS. 1-17 is generally cylindrical in shape and includes a generally cylindrical body 20 having a front side 21 and a rear side 22, with a circular central passage 23 extending through the cylindrical body 20 in an axial direction A (see FIG. 3) from the front side 21 to the rear side 22. The cylindrical body 20 also has an inner surface 24 defining the central passage 23 and an outer surface 25 opposite the inner surface 24. In one embodiment, the cylindrical body 20 is at least partially or completely formed of a metallic material such as aluminum, or another alloy such as stainless steel or other steel, etc. In the embodiment of FIGS. 1-17, the cylindrical body 20 is formed of two pieces 26, 27 that are held together with fasteners 28 to form a unitary body. The pieces 26, 27 are shown separately in FIGS. 5 and 10-12. The cylindrical body 20 may be formed of a single, integral piece of aluminum or other metallic material in another embodiment. The inner surface 24 and the outer surface 25 of the cylindrical body 20 are illustrated as defining circular inner and outer peripheries, and in other embodiments, one or both of the inner and outer surfaces 24, 25 may define a non-circular periphery. For example, in one embodiment, the inner surface 24 may define a circular passage 23 with an outer surface 25 that defines a non-circular shape.

The clamping member 15 in the embodiment of FIGS. 1-17 is in the form of a substantially annular body 30 that extends from a first end 31 peripherally or circumferentially around the central passage 23 of the primary member 12 to a second end 32. In this context, a "substantially annular" structure refers to a structure that has an annular or ring-like structure, but may not form a complete annulus or ring. A gap 33 exists between the ends 31, 32, such that the inner dimension (i.e., width/diameter or perimeter/circumference) of the clamping member 15 can be increased or decreased by moving the ends 31, 32 closer to or further away from each other, or in other words, decreasing or increasing the width of the gap 33. The actuator mechanism 14 in this embodiment is configured for movement between a locked position and an unlocked position to manipulate the clamping member 15 to move the ends 31, 32 closer together in the locked position (FIGS. 8-9) and farther apart in the unlocked position (FIGS. 6-7). The clamping member 15 is biased toward the unlocked position in this embodiment, such as by an expansive spring force formed by bending the clamping member 15.

The cylindrical body 20 of the primary member 12 in FIGS. 1-17 has a circumferential channel 29 on the inner surface 24 that receives the clamping member 15, such that the body 30 of the clamping member 15 extends around the inner surface 24 of the cylindrical body 20. The depth of the channel 29 is such that the clamping member 15 does not interfere with insertion of the mounting member 11 through the passage 23 when the actuator 40 is in the unlocked position. The primary member 12 also has a cavity 36 (or cavities) within the wall of the cylindrical body 20 for receiving and engaging portions of the clamping member 15 and the actuator mechanism 14 to permit operation of the same. The cylindrical body 20 in FIGS. 1-17 has a single cavity 36 that is open both at the inner and outer surfaces 24, 25 of the cylindrical body 20, but multiple cavities may be used in other embodiments. Additionally, the primary member 12 in the embodiment of FIGS. 1-17 has an opening 72 extending inward from the outer surface 25 to the cavity 36, which is defined by opposing slots 73 in the two pieces 26, 27. The opening 72 may have angled or beveled edges in one embodiment.

The clamping member 15 has connection members 34, 35 at the ends 31, 32 that are engaged with the primary member 12 and the actuation mechanism 14 to connect the clamping member 15 to the primary member 12 and to the actuation mechanism 14. Both of the connection members 34, 35 in the embodiment of FIGS. 1-17 are in the form of hook-shaped lips that engage complementary structures on the primary member 12 and the actuation mechanism 14 by receiving a portion of the primary member 12 or the actuation mechanism 14 behind and/or beneath the connection member 34, 35, such that the biasing force on the clamping member 15 presses the connection members 34, 35 into engagement with the primary member 12 and the actuation mechanism 14. The first connection member 34 in this embodiment is connected to the primary member 12 by engaging a protrusion 37 on the primary member 12 and wrapping around the protrusion 37 so that a portion of the first connection member 34 is received in a notch 38 adjacent the protrusion 37 that forms a portion of the cavity 36. The second connection member 35 is engaged with the actuator mechanism 14 in a similar manner, and one embodiment of such engagement is described in greater detail herein.

In the embodiment of FIGS. 1-17, the clamping member 15 may have one or more gripping members 39 positioned on the inner surface and configured to engage the mounting member 11 to increase friction between the clamping member 15 and the mounting member 11. In one embodiment, the gripping member(s) 39 may be formed of a material that is softer than the material of the clamping member 15 and with a higher coefficient of friction, such as a rubber material, a polyurethane material, or other polymer material. The material of the gripping member(s) 39 may also be compressible, such that reducing the width of the clamping member 15 in the locked position compresses the gripping member(s) 39 between the clamping member 15 and the mounting member 11. The gripping member(s) 39 may be received within a notch or channel in the clamping member 15 in one embodiment. FIGS. 7-8 show one embodiment of a gripping member 39 in the form of an annular member positioned around the inner surface of the clamping member 15 and formed of a high-friction resilient material.

The actuator mechanism 14 includes an actuator 40 in the form of a lever or other pivoting member connected to the primary member 12 and configured to be manipulated by a user, and an engagement member in the form of a pivot arm 41 connected to the actuator 40 and configured to engage the second end 32 of the clamping member 15 to push the first and second ends 31, 32 of the clamping member 15 together when the actuator 40 is moved to the locked position. In the embodiment of FIGS. 1-17, the actuator 40 is in the form of a cam lever that has a pivot connection 42 connected to the primary member 12 and an eccentric connection 43 spaced from the pivot connection 42, where the pivot arm 41 is connected to the actuator 40 at the eccentric connection 43. The actuator 40 further has a handle 45 extending outward and configured for gripping by a user for manipulation of the actuator 40. In the embodiment of FIGS. 1-17, the pivot connection 42 is positioned between the eccentric connection 43 and the handle 45. The eccentric connection 43 in this embodiment is positioned on a protrusion 46 extending from the actuator 40 at the end opposite the handle 45, thereby spacing the eccentric connection 43 from the pivot connection 42. The protrusion 46 in the embodiment shown in FIG. 16 has a rounded end. The pivot arm 41 also has a distal end 44 spaced from the eccentric connection 43 and configured to engage the second connection member 35 of the clamping member 15. A portion of the pivot arm 41 (e.g., the end 44 thereof) is positioned behind and/or beneath the second connection member 35, such that the second connection member 35 wraps around the portion of the pivot arm 41.

In the configuration of FIGS. 1-17, the actuator 40 pivots about the pivoting connection 42 in moving between the locked and unlocked positions, and pivoting of the actuator 40 results in generally tangential movement of the pivot arm 41 toward or away from the first end 31 of the clamping member 31. With reference to FIGS. 6-9, the actuator 40 pivots counterclockwise to move from the unlocked position (FIGS. 6-7) to the locked position (FIGS. 8-9), and this pivoting causes counterclockwise revolution of the eccentric connection 43 about the pivot connection 42, pushing the pivot arm 41 upward and to the right. This action pushes the second end 32 of the clamping member 15 toward the first end 31 to narrow the inner width of the clamping member, causing the clamping member 15 to engage the mounting member 11. Again with reference to FIGS. 6-9, the actuator 40 pivots clockwise to move from the locked position (FIGS. 8-9) to the unlocked position (FIGS. 6-7), and this pivoting causes clockwise revolution of the eccentric connection 43 about the pivot connection 42, pulling the pivot arm 41 down and to the left. This action allows the second end 32 of the clamping member 15 to separate from the first end 31 via the biasing force of the clamping member 15 to increase the inner width of the clamping member 15 to release the mounting member 11. Viewed another way, the actuator 40 pivots such that the handle 45 rotates toward the outer surface 25 of the primary member 12 when moving from the unlocked position to the locked position, and the reverse is true when moving from the locked position to the unlocked position. In this configuration, the actuator 40 "pushes" the pivot arm 41 when moving from the unlocked position to the locked position, such that the pivot arm 41 travels ahead of the eccentric connection 43 in the direction of travel, and the actuator 40 "pulls" the pivot arm 41 when moving from the locked position to the unlocked position, such that the pivot arm 41 travels behind the eccentric connection 43 in the direction of travel.

Figure 11:
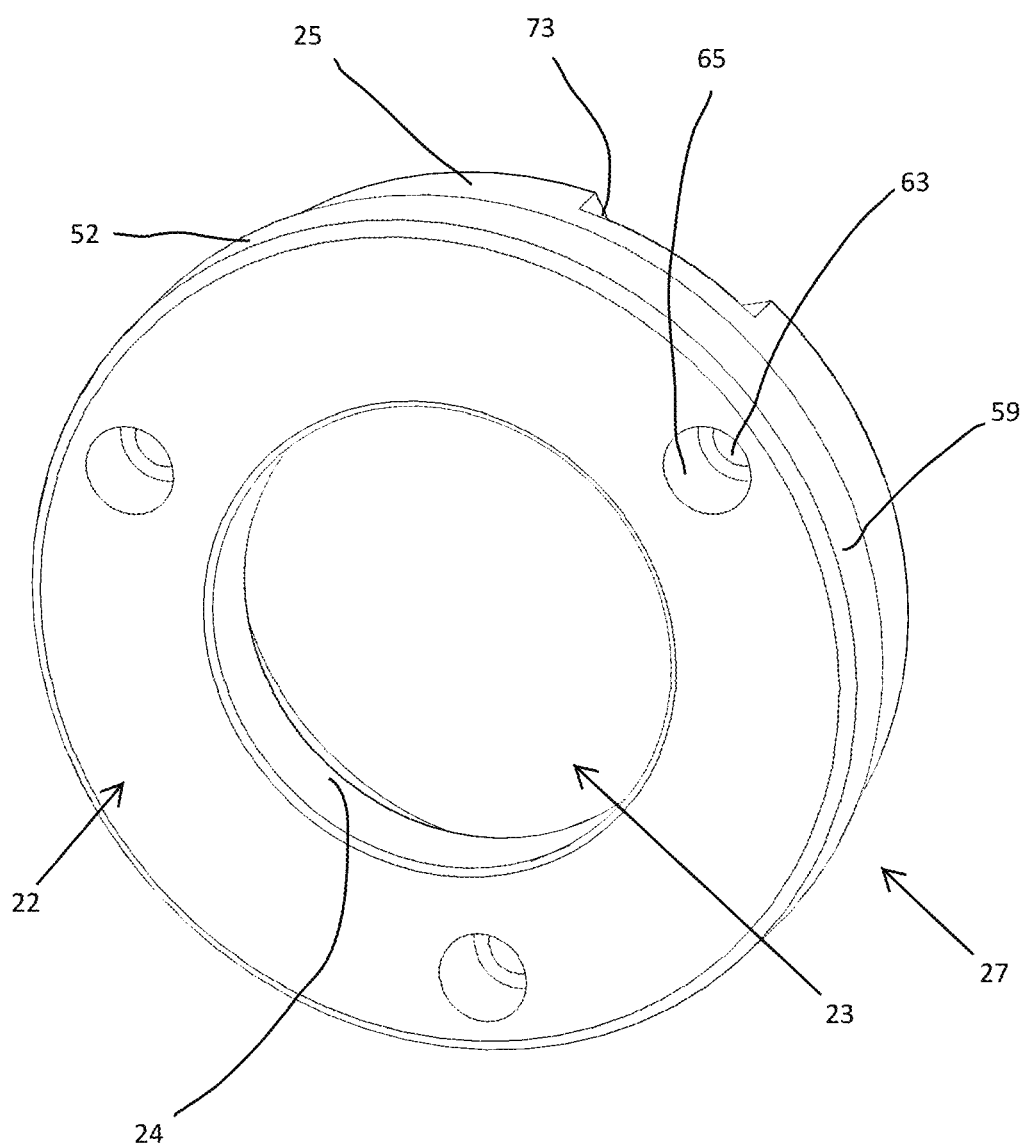
FIG. 11 is a rear perspective view of a second piece of the primary member of the clamping device of FIG. 1.
Figure 12:
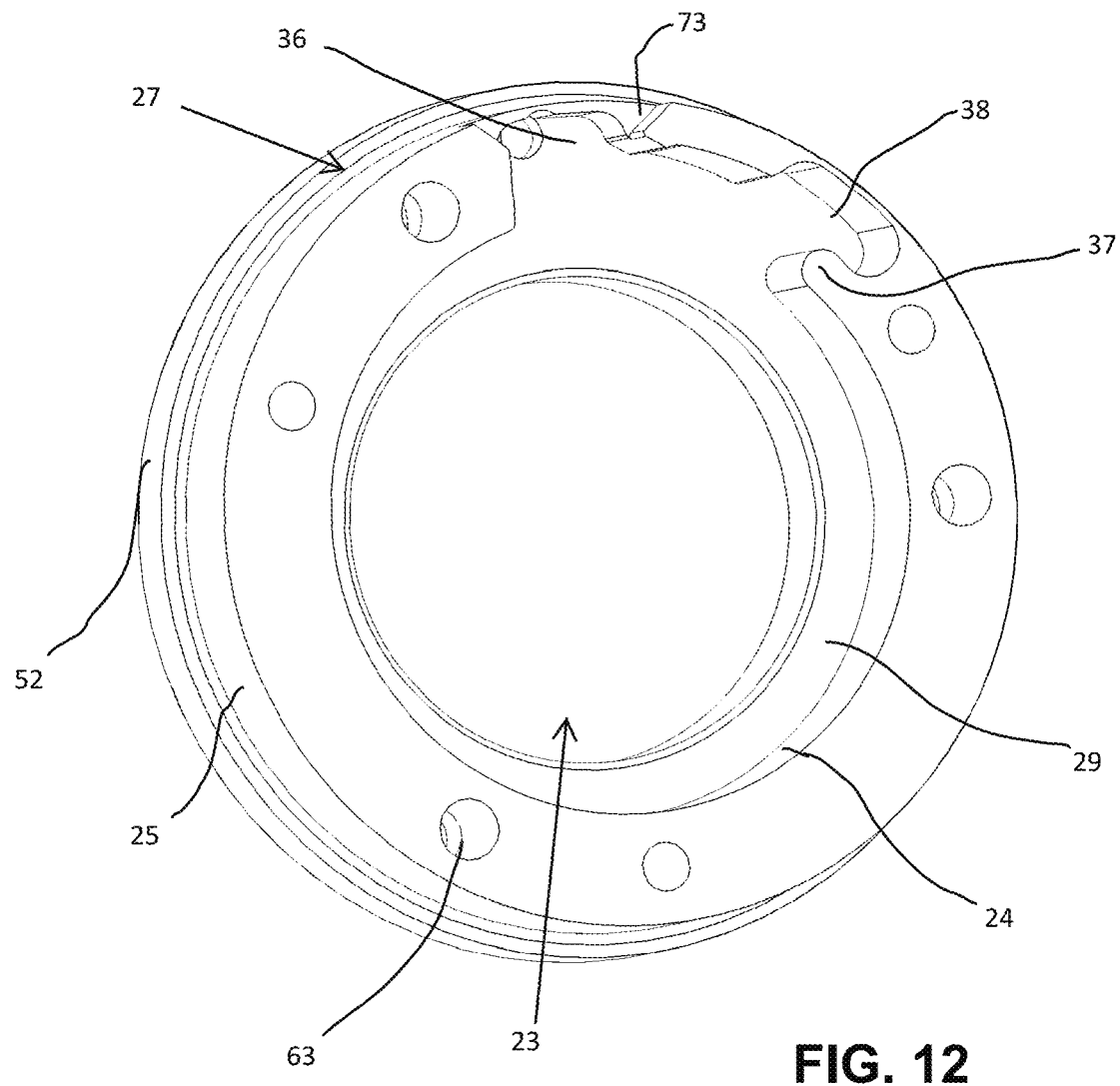
FIG. 12 is a front perspective view of the second piece of the primary member of FIG. 11.
Figure 13:
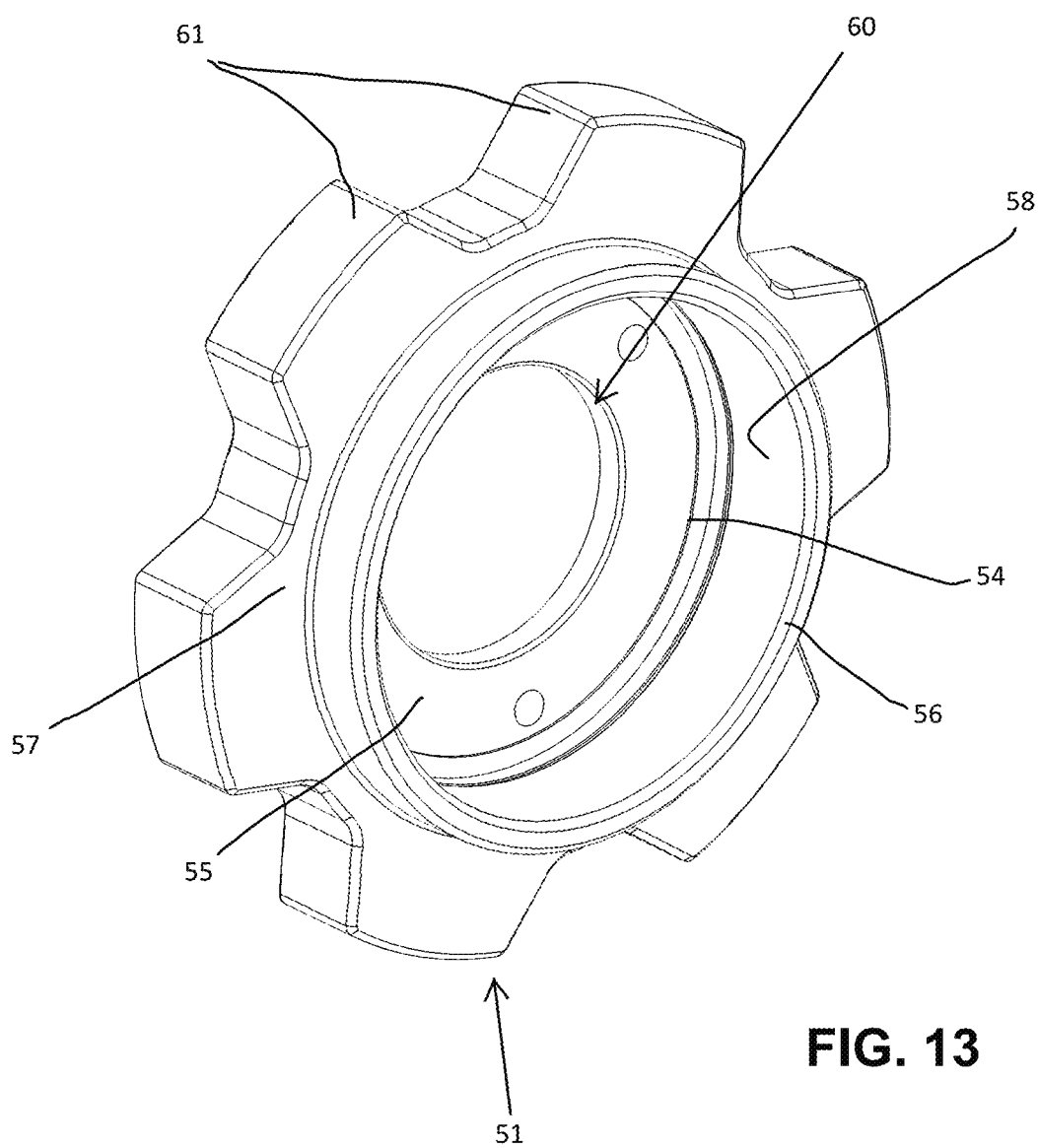
FIG. 13 is a front perspective view of an input member of the clamping device of FIG. 1.
Figure 14:
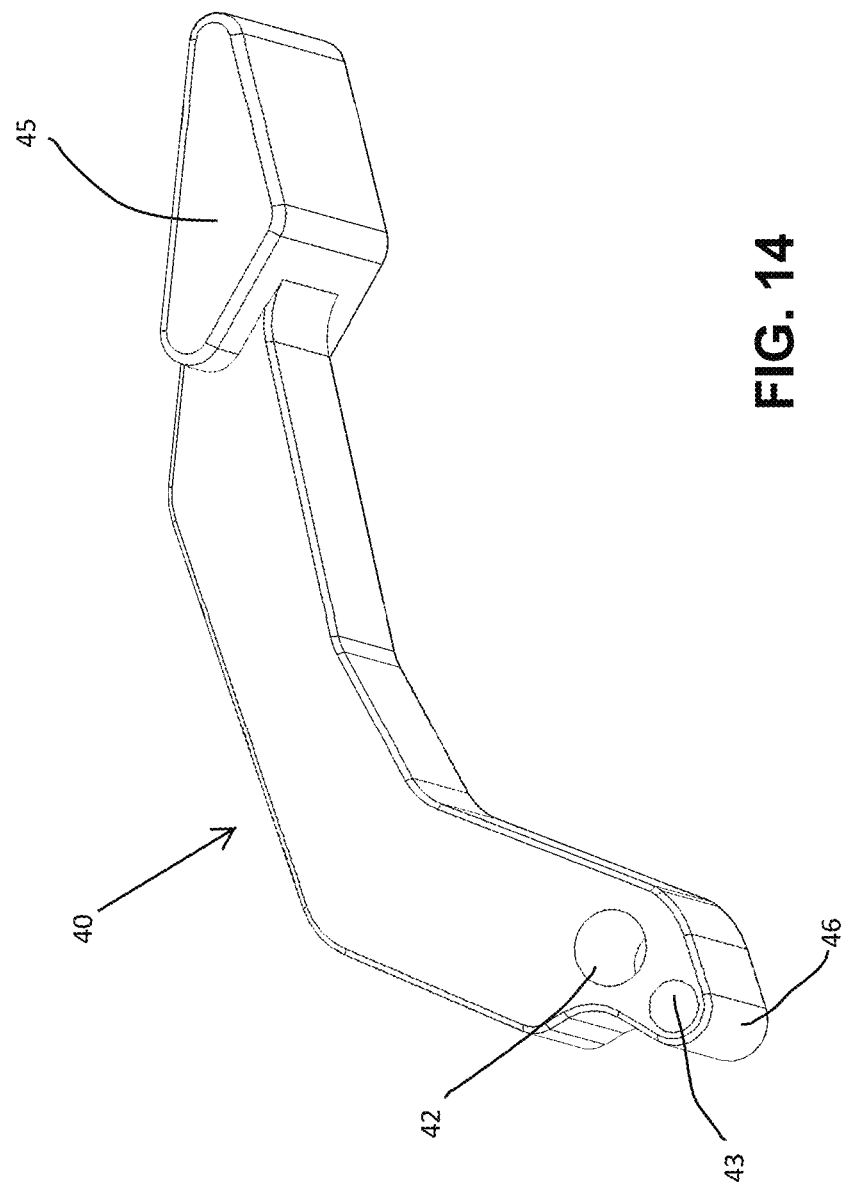
FIG. 14 is a perspective view of an actuator of the clamping device of FIG. 1.
Figure 15:
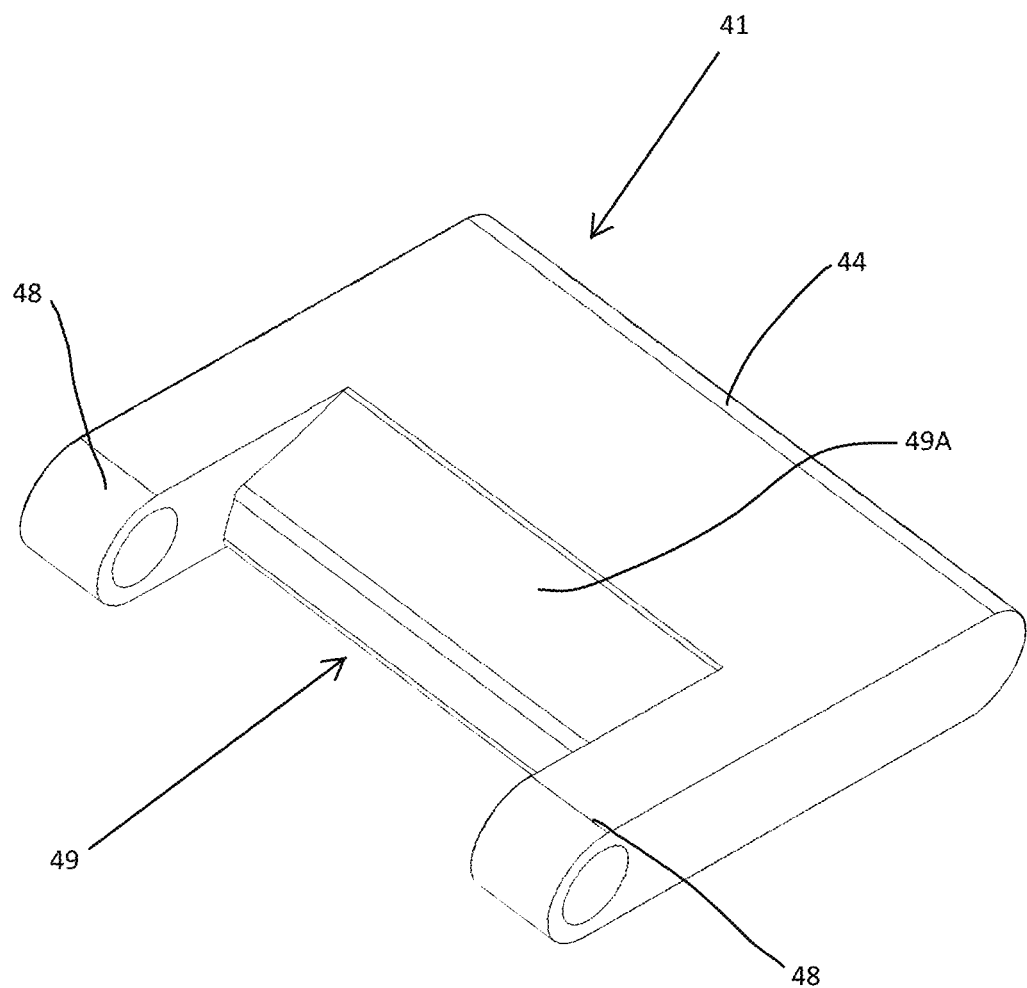
FIG. 15 is a perspective view of a pivot arm of the clamping device of FIG. 1.

The actuator 40 and the pivot arm 41 in FIGS. 1-17 are connected together and to the primary member 12 within the cavity 36, such that the pivot connection 42 and the eccentric connection 43 are positioned within the cavity 36. The pivot arm 41 in FIGS. 1-17 is in the form of a plate-like member having two legs 48 with a slot or space 49 therebetween, and a portion of the actuator 40 is positioned between the legs 48. The actuator 40 in FIGS. 1-17 has at least the protrusion 43 positioned between the legs 48 and within the slot 49 of the pivot arm 41. The pivot arm 41 also has an angled or beveled surface 49A extending between the legs 48 at the end of the recess 49, as shown in FIG. 12. In the configuration of FIGS. 1-17, a pin 47A extends through at least one (or both) of the legs 48 and the actuator 40 to connect the actuator 40 with the pivot arm 41, forming the eccentric connection 43. The actuator 40 is also connected to the primary member 12 by a pin 47B that extends through the actuator 40 and into the cylindrical body 20 on one or both sides of the cavity 36 to form the pivot connection 42. In the embodiment of FIGS. 1-17, the actuator 40 extends into the cavity 36 through the opening 72 in the primary member 12. The actuator mechanism 14 may have a different structural and/or functional configuration in other embodiments.

Figure 16:
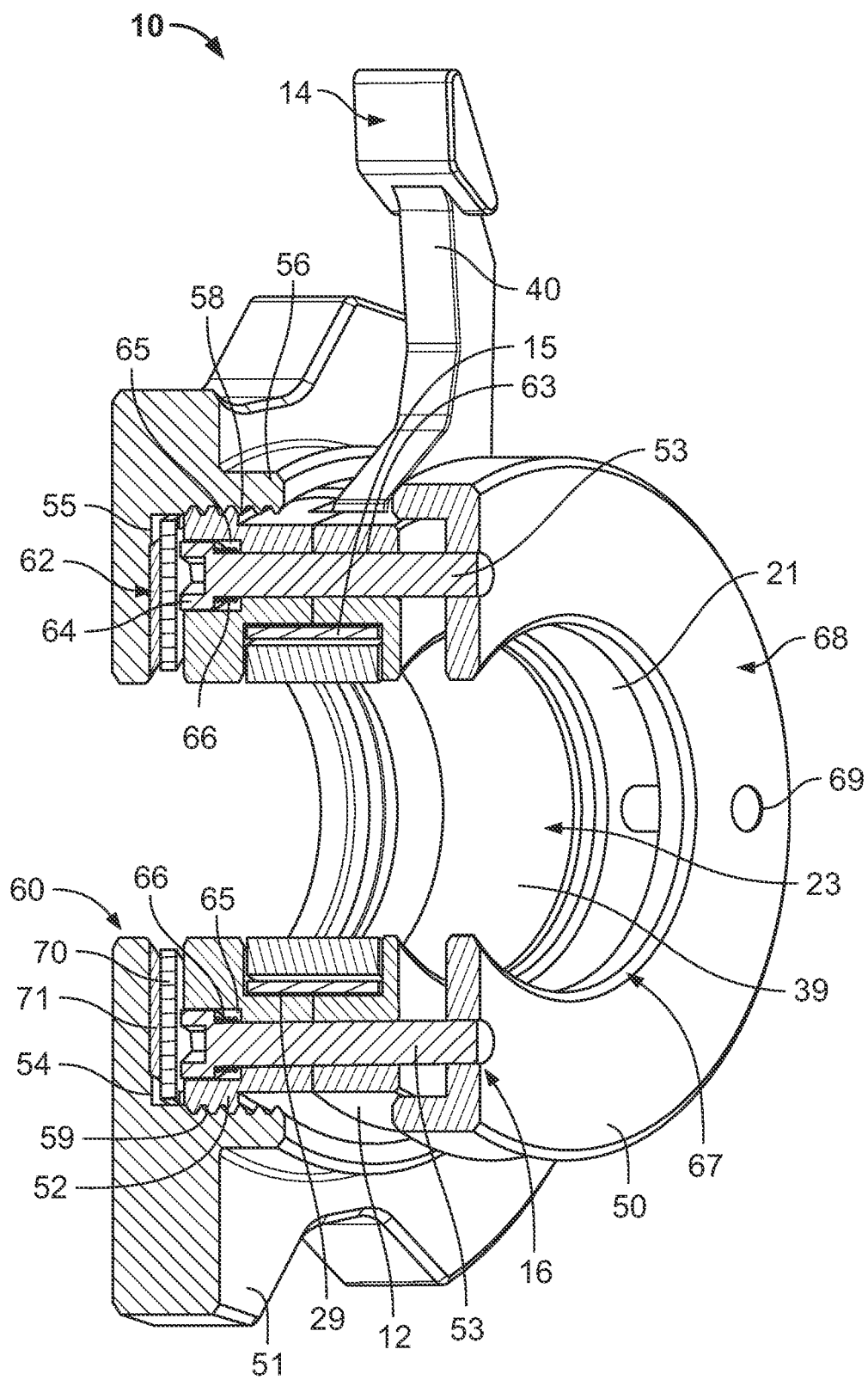
FIG. 16 is a perspective cross-section view of the clamping device of FIG. 1 with the actuator mechanism shown in the unlocked position and an engagement mechanism of the clamping device shown in an axially advanced position.
Figure 17:
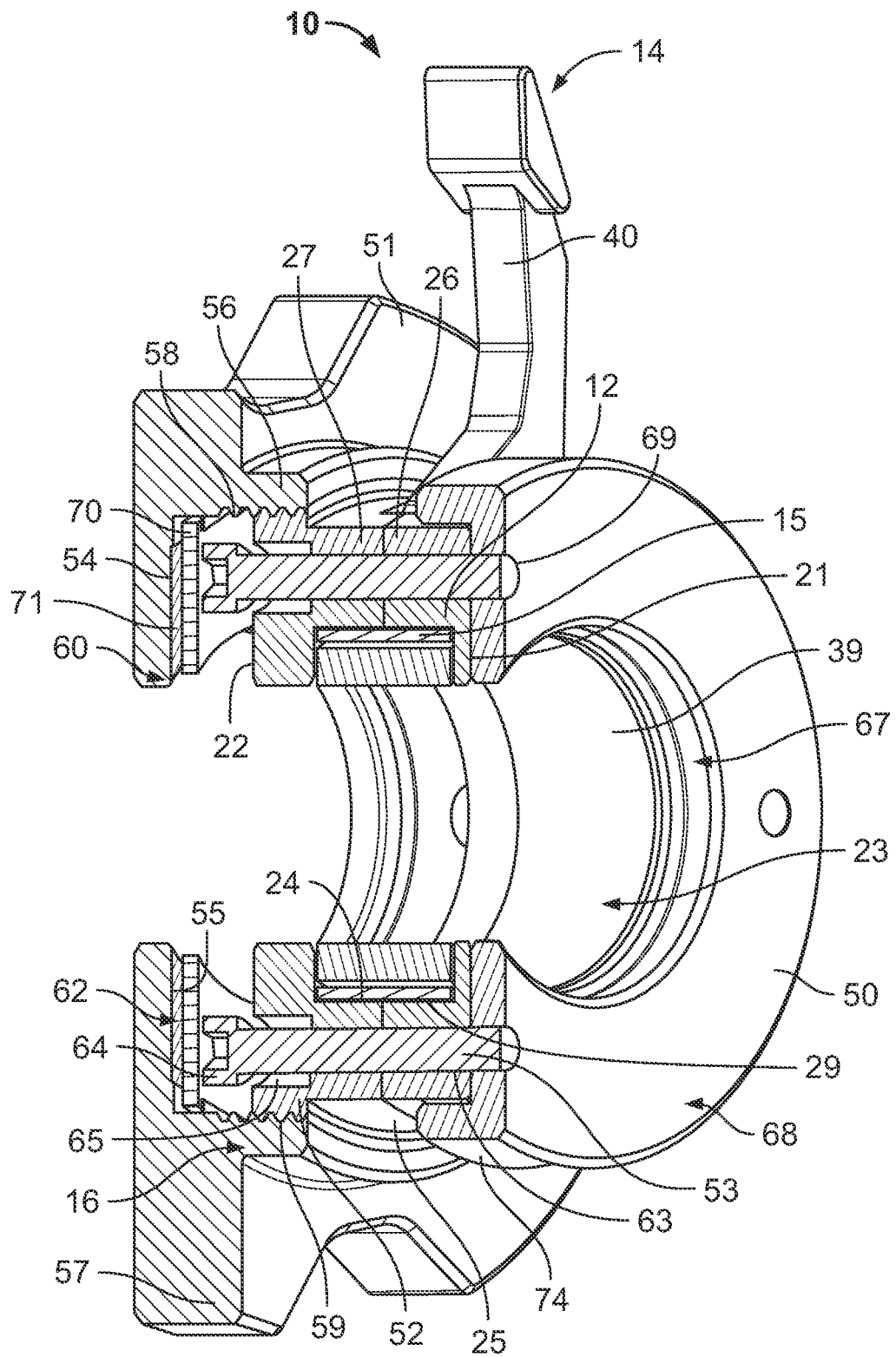
FIG. 17 is a perspective cross-section view of the clamping device of FIG. 1 with the actuator mechanism shown in the unlocked position and the engagement mechanism shown in an axially retracted position.

As described above, the clamping device 10 may include an engagement mechanism 16 configured to engage a surface 17 adjacent to the position of the clamping device 10 on the mounting member 11 (e.g., the side of one or more of the weight(s) 13). In the embodiment of FIGS. 1-17, the engagement mechanism 16 includes an abutment member 50 configured to be engaged in abutment with the surface 17, and the engagement mechanism 16 is configured to drive axial movement of the abutment member 50 toward or away from the surface 17, as desired. In one embodiment, the engagement mechanism 16 includes an input member 51 and one or more linkages 53 engaging the input member 51 and the abutment member 50, such that the input member 51 is configured to be manipulated by the user to drive the axial movement of the abutment member 50 via engagement with the linkage(s) 53. The engagement mechanism 16 in FIGS. 1-17 includes three linkages 53 in the form of pins that extend axially and are symmetrically arranged with respect to the central passage 23. The linkages 53 and the abutment member 50 may move axially as a single unit in one embodiment. As shown in FIGS. 16-17, the input member 51 and the abutment member 50 are spaced axially from each other and positioned on opposite sides of the clamping device 10 relative to the central axis of the central passage 23. In another embodiment, the engagement mechanism 16 may include a plurality of linkages 53 in a different number or arrangement. In the engagement mechanism 16 of FIGS. 1-17, the input member 51 is moveable both rotationally and axially with respect to the primary member 12, while the linkages 53 and the abutment member 50 are moveable only axially.

The input member 51 generally has a body 57 that has an opening 60 that is in communication with the central passage 23 of the primary member 12 so the mounting member 11 can extend through the primary member 12 and the input member 51 continuously. The input member 51 in this embodiment is shown separately in FIGS. 5 and 13. The input member 51 in the embodiment of FIGS. 1-17 is connected to the primary member 12 such that the input member 51 is rotatable with respect to the primary member 12. The input member 51 has a plurality of lugs 61 extending radially outward around the periphery thereof, to assist in gripping by a user to exert force for rotation of the input member 51. The input member 51 in FIGS. 1-17 engages the primary member 12 through complementary threading, such that rotation of the input member 51 moves the input member axially toward or away from the surface 17, depending on the rotation direction.

As shown in FIGS. 5, 13, and 16-17, the input member 51 is configured with a cup-like shape, with a cylindrical receiver 54 on the front surface 55 and a wall 56 that extends outward from the front surface 55. The wall 56 extends around the entire periphery of the receiver 54 in a cylindrical manner in the embodiment of FIGS. 1-17, but in another embodiment, the wall 56 may be discontinuous, such as a plurality of flanges arranged around the receiver 54 and spaced from each other. Additionally, the receiver 54 is formed as a recess that extends inward into the body 57 of the input member 51, axially beyond the juncture between the wall 56 and the body 57 of the input member 56 in the embodiment of FIGS. 1-17. In another embodiment, the receiver 54 may be entirely defined by the wall 56 and may not be recessed into the body 57 of the input member 51. The wall 56 engages the primary member 12 to connect the input member 51 to the primary member 12 in a rotatable manner, and the wall 56 and the primary member 12 include complementary threading 58, 59, respectively, to achieve this connection. In the embodiment of FIGS. 1-17, the primary member 12 has threading 59 around the outer surface 25 of the cylindrical body 20 positioned on a ridge 52 that extends outward from the outer surface 25, and the wall 56 has threading 58 on the inner surface to engage the threading 59 of the primary member 12. As described herein, rotation of the input member 51 in this configuration results in axial movement of the input member 51.

In other embodiments, the engagement mechanism 16 may further include a drive body (not shown) that is operably engaged by the input member 51 to achieve axial movement and one or more linkages 53 engaging the drive body and the abutment member 50 such that axial movement of the drive body drives axial movement of the abutment member 50. In this embodiment, the drive body is configured to engage the input member 51 such that manipulation of the input member 51 (e.g., rotation) drives axial movement of the drive body. For example, the drive body may be a circular plate that is positioned between the input member 51 and the primary member 12, within the receiver 54 of the input member 51, and the drive body may engage the input member 51 by complementary threading on the outer periphery of the drive body and the inner surface of the receiver 54 of the input member 51. In this configuration, rotation of the input member 51 drives axial movement of the drive body, rather than axial movement of the input member 51, and the drive body engages the linkages 53 to drive axial movement of the linkages 53 and the abutment member 50.

The linkages 53 operably engage the input member 51 and the abutment member 50 such that axial movement of the input member 51 (i.e., along the axial direction A) creates axial movement of the linkages 53, which create axial movement of the abutment member 50. The input member 51 and the abutment member 50 are positioned on opposite sides of the primary member 12 in the embodiment of FIGS. 1-17, and in this configuration, the linkages 53 extend through the primary member 12 to engage the input member 51 and the abutment member 50. The clamping device 10 of FIGS. 1-17 has three linkages 53 that extend through passages 63 that extend in the axial direction A through the wall of the cylindrical body 20 from the front side 21 to the rear side 22. The passages 63 are symmetrically oriented and parallel to each other, and the passages 63 are located at 120° intervals around the cylindrical body 20 in this configuration. The linkages 53 have enlarged heads 64 in the embodiment of FIGS. 1-17, and the passages 63 have countersunk recesses 65 on the rear side 22 that receive the enlarged heads 64, as shown in FIGS. 11 and 16-17. In this embodiment, springs or other biasing members 66 may be positioned between the heads 64 and the bottoms of the recesses 65 to bias the linkages 53 in the axial direction A away from the front side 21 (and toward the rear side 22) of the primary member 12 and to thereby bias the abutment member 50 toward the front side 21 (and toward the rear side 22) of the primary member 12 and away from the surface 17. FIG. 16 illustrates biasing members 66 in the form of coil springs wrapped around the shaft of each linkage 53. In another embodiment, the clamping device 10 may include biasing members having a different position or structure to achieve the same purpose. Additionally, the engagement mechanism 16 may use linkages 53 that are differently configured or positioned.

The input member 51 is rotatable with respect to the linkages 53, and may include a friction-reducing rotation mechanism 62 that engages the ends of the linkages 53 to permit relative rotation of the input member 51 with respect to the linkages. The rotation mechanism 62 may be at least partially positioned within the receiver 54. In various embodiments, the rotation mechanism 62 may include one or more components that are fixed with respect to the input member 51 and moveable with respect to the linkages 53 and/or one or more components that fixedly engage the linkages 53 and are rotatably engaged with the input member 51. The engagement mechanism 16 in FIGS. 1-17 includes a rotation mechanism 62 in the form of a contact member 70 (in the form of a contact plate) and a thrust bearing 71 positioned within the receiver 54 to permit rotation of the input member 51 with respect to the linkages 53 without significant friction or abrasion. In this embodiment, the contact member 70 engages the ends of the linkages 53 and is positioned between the linkages 53 and the thrust bearing 71, and the thrust bearing 71 engages the contact member 70 and the body 57 of the input member 51. This configuration permits the input member 51 to rotate with respect to the contact member 70, which remains substantially static during rotation of the input member 51. Axial advancement of the input member 51 toward the front side 21 of the primary member 12 exerts axial force on the linkages 53 through the thrust bearing 71 and the contact member 70. The contact member 70 in one embodiment may engage the linkages 53 in a partial or complete rotation-locking manner, such as frictional engagement or through complementary or interlocking structures, but may alternately be fixed to the linkages 53 in another embodiment. The engagement mechanism 16 in other embodiments may include different friction-reducing structures in order to facilitate rotation of the input member 51 with respect to the linkages 53.

The abutment member 50 in FIGS. 1-17 is in the form of a cup-shaped member with a cylindrical wall 74 extending rearward from an abutment surface 68 that forms a front end of the clamping device 10. The abutment member 50 may include an opening 67 in communication with the central passage 23 of the primary member 12 and the opening 60 of the input member 51, so the mounting member 11 can extend through the abutment member 50, the primary member 12, and the input member 51 continuously. The abutment member 50 in FIGS. 1-17 also has the abutment surface 68 positioned around the opening 67 and a plurality of receivers 69 open to at least the opposite side of the abutment member 50 from the abutment surface 68. The receivers 69 receive and engage the linkages 53 so that the linkages 53 and the abutment member 50 move axially together as a single unit in one embodiment. The receivers 69 and the linkages 53 in FIGS. 1-17 include complementary threading to achieve this engagement. The linkages 53 in this configuration can be inserted into and through the passages 63 from the rear side 22 of the primary member 12, such that the linkages 53 extend through the primary member 12 and out of the passages 63 on the front side 21, and then the linkages 53 can be rotated to threadably engage the receivers 69. The linkages 53 may include a rotational engaging structure on the head 64 to facilitate this rotation, such as a structure configured for engagement by a screw, socket, Allen wrench, etc. The cup-shaped abutment member 50 in the embodiment of FIGS. 1-17 receives a portion of the primary member 12, including at least the front side 21 thereof, such that the wall 74 encircles a portion of the outer surface 25 of the primary member 12 when the abutment member 50 is fully rearwardly retracted, as shown in FIG. 17. As the abutment member 50 is advanced farther forward and away from the front side 21 of the primary member 12 (see FIG. 16), the primary member 12 may have no portion received by the abutment member 50.

The clamping device 10 in FIGS. 1-17 can be operated by first inserting the mounting member 11 axially through the opening 67 of the abutment member 50, the central passage 23 of the primary member 12 and the opening 60 of the input member 51, and moving the clamping device 10 axially toward the surface 17 until the clamping device 10 reaches the desired position. In general, the desired position will have the abutment surface 68 of the abutment member 50 engaging or closely confronting the surface 17. As described herein, in one embodiment, the mounting member 11 may be a portion of a barbell, and the surface 17 may be the surface of a weight plate mounted on the barbell. The actuator mechanism 14 can be placed in the unlocked position during insertion of the mounting member 11, and when the clamping device 10 is in the desired position, the actuator mechanism 14 is moved to the locked position, e.g., by rotating the actuator 40 as described herein. After the clamping device is locked in place, the engagement mechanism 16 is manipulated to bring the abutment member 50 into closer and tighter engagement with the surface 17, e.g., by rotating the input member 51 as described herein. FIG. 16 shows the clamping device 10 of FIGS. 1-17 with the abutment member 50 in an axially advanced position relative to FIG. 17, which shows the abutment member 50 in the farthest axially retracted position. The clamping device 10 can be removed from the mounting member 11 by placing the actuator mechanism 14 in the unlocked position and then sliding the clamping device 10 axially until disengaged from the mounting member 11. The engagement mechanism 16 may be loosened by rotation of the input member 51 prior to removal if desired.

Various embodiments of clamping devices have been described herein, which include various components and features. In other embodiments, the clamping device may be provided with any combination of such components and features. It is also understood that in other embodiments, the various devices, components, and features of the clamping device described herein may be constructed with similar structural and functional elements having different configurations, including different ornamental appearances.

The embodiments of clamping devices 10 disclosed herein provide benefits and advantages with respect to existing barbell collars and other clamping devices. The configurations of the actuator mechanism 14 and the clamping member 15 permit secure, reliable engagement of a barbell or other mounting member 11 that can exert significant clamping force to resist movement under large axial loads. The configuration of the engagement mechanism 16 permits secure engagement with a surface 17, such as to avoid axial momentum that may be transferred to the clamping device 10 through even small movements of large weights. The position of the input member 51 at the opposite end of the clamping device 10 from the abutment member 50 facilitates manipulation of the input member 51 relative to existing clamping devices, where a rotating input member is positioned at or immediately adjacent to the surface 17, causing difficulty in manipulation and friction against the surface 17. This friction against the surface 17 may further limit the potential tightening force of such existing devices, and the positioning of the input member 51 at the opposite end of the clamping device 10 from the abutment member 50 therefore increases the potential tightening force of the clamping device 10 against the surface 17. Still further benefits and advantages are readily recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "top," "bottom," "front," "back," "side," "rear," "proximal," "distal," and the like, as used herein, are intended for illustrative purposes only and do not limit the embodiments in any way. Nothing in this specification should be construed as requiring a specific three dimensional orientation of structures in order to fall within the scope of this invention, unless explicitly specified by the claims. "Integral joining technique," as used herein, means a technique for joining two pieces so that the two pieces effectively become a single, integral piece, including, but not limited to, irreversible joining techniques such as welding, brazing, soldering, or the like, where separation of the joined pieces cannot be accomplished without structural damage thereto. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A clamping device comprising:
    a primary member comprising a cylindrical body having a front side and a rear side, with a central passage extending in an axial direction from the front side to the rear side and configured for receiving a mounting member therethrough, and a plurality of passages positioned around the central passage, the passages extending through the body in the axial direction from the front side to the rear side;
    a clamping member disposed at least partially within the central passage of the primary member and having an inner surface extending around at least a portion of the central passage and defining an inner width, wherein the clamping member is configured for selectively engaging the mounting member when the mounting member is received in the central passage;
    an actuator mechanism engaged with the clamping member and configured to be moveable between an unlocked position, where the inner width of the clamping member is wider and the clamping member does not securely engage the mounting member to permit the mounting member to be removed from the central passage, and a locked position, where the actuator mechanism moves the clamping member such that the inner width of the clamping member is narrower and the clamping member is configured to securely engage the mounting member to resist movement of the primary member with respect to the mounting member; and
    an engagement mechanism configured to engage a surface adjacent to the front side of the primary member, the engagement mechanism comprising:
        an abutment member having a first opening configured to receive the mounting member therethrough, and positioned at the front side of the primary member and configured to move along the axial direction with respect to the primary member and having an abutment surface configured to confront the surface;
        an input member having a second opening configured to receive the mounting member therethrough, and threadably engaged with the primary member and positioned at the rear side of the primary member, wherein the input member is configured to move along the axial direction with respect to the primary member by rotation with respect to the primary member via the threadable engagement;
        a plurality of linkages extending in the axial direction through the plurality of passages, the linkages operably engaging the abutment member and the input member such that the abutment member, the linkages, and the input member move together along the axial direction, wherein movement of the input member along the axial direction by rotation is configured to move the linkages in the axial direction to drive movement of the abutment member in the axial direction toward the surface to cause the abutment surface to abut the surface.

2. The clamping device of claim 1, wherein the input member comprises a body having a cylindrical wall defining a receiver that receives the rear side of the primary member, and wherein an inner surface of the cylindrical wall and an outer surface of the primary member have complementary threading to threadably engage the input member with the primary member.

3. The clamping device of claim 1, further comprising a plurality of springs, each of the springs engaging one of the plurality of linkages to bias the linkages in the axial direction toward the rear side of the primary member, such that the abutment member is biased in the axial direction by engagement with the linkages.

4. The clamping device of claim 1, wherein the engagement mechanism further comprises a contact member engaging the linkages and a thrust bearing engaging the contact member and the input member, wherein rotational movement of the input member is configured to drive axial movement of the linkages through the thrust bearing and the contact member.

5. The clamping device of claim 1, wherein the abutment surface has a wall extending from the abutment surface toward the rear side of the primary member to define a cup-shape receiving the front side of the primary member.

6. The clamping device of claim 1, wherein the clamping member comprises a substantially annular body that extends from a first end peripherally around the central passage of the primary member to a second end, and wherein the actuator mechanism is configured to engage the clamping member to move the first and second ends closer together in the locked position, thereby narrowing the inner width of the clamping member, and farther apart in the unlocked position, thereby widening the inner width of the clamping member.

7. An assembly comprising the clamping device of claim 1, wherein the clamping device is a barbell clamp, and further comprising the mounting member in the form of a barbell and a weight plate mounted on the barbell, the weight plate defining the surface, wherein the clamping device is mounted on the barbell such that a portion of the barbell extends through the central passage, and the abutment surface abuts the surface of the weight plate.

8. The clamping device of claim 1, wherein the abutment member extends completely around the first opening.

9. A clamping device comprising:
a primary member comprising a body having a front side and a rear side, with a central passage extending in an axial direction from the front side to the rear side and configured for receiving a mounting member therethrough;
a clamping member disposed at least partially within the central passage of the primary member and having an inner surface extending around at least a portion of the central passage and defining an inner width, wherein the clamping member is configured for selectively engaging the mounting member when the mounting member is received in the central passage;
an actuator mechanism engaged with the clamping member and configured to be moveable between an unlocked position, where the inner width of the clamping member is wider and the clamping member does not securely engage the mounting member to permit the mounting member to be removed from the central passage, and a locked position, where the actuator mechanism moves the clamping member such that the inner width of the clamping member is narrower and the clamping member is configured to securely engage the mounting member to resist movement of the primary member with respect to the mounting member; and
an engagement mechanism configured to engage a surface adjacent to the front side of the primary member, the engagement mechanism comprising:
an abutment member having a first opening configured to receive the mounting member therethrough, and positioned at the front side of the primary member and configured to move along the axial direction with respect to the primary member and having an abutment surface configured to confront the surface;
an input member having a second opening configured to receive the mounting member therethrough, and moveably engaged with the primary member and positioned at the rear side of the primary member, wherein the input member is configured to move along the axial direction with respect to the primary member;
a linkage extending axially between the abutment member and the input member through a passage extending through the body of the primary member, and operably engaging the abutment member and the input member such that the abutment member, the linkage, and the input member move together along the axial direction, wherein the input member is configured to be manipulated by a user to move the input member in the axial direction, thereby moving the linkage in the axial direction to drive movement of the abutment member in the axial direction toward the surface to cause the abutment surface to abut the surface and to hold the abutment surface in rigid abutment with the surface.

10. The clamping device of claim 9, wherein the input member is threadably engaged with the primary member, such that the input member is moveable in the axial direction by rotating with respect to the primary member.

11. The clamping device of claim 10, wherein the input member comprises a body having a cylindrical wall defining a receiver that receives the rear side of the primary member, and wherein an inner surface of the cylindrical wall and an outer surface of the primary member have complementary threading to threadably engage the input member with the primary member.

12. The clamping device of claim 9, further comprising a biasing member engaged with the engagement mechanism and configured to bias the abutment member in the axial direction toward the rear side of the primary member.

13. The clamping device of claim 12, wherein the biasing member comprises a spring engaging the linkage to bias the linkage in the axial direction toward the rear side of the primary member, such that the abutment member is biased in the axial direction by engagement with the linkage.

14. The clamping device of claim 9, further comprising a plurality of linkages, including the linkage, each of the plurality of linkages operably engaging the abutment member and the input member, wherein the input member is configured to be manipulated by the user to move the plurality of linkages in the axial direction to drive movement of the abutment member in the axial direction toward the surface.

15. The clamping device of claim 9, wherein the input member is rotatable with respect to the primary member, and the engagement mechanism further comprises a contact member engaging the linkage and a thrust bearing engaging the contact member and the input member, wherein rotational movement of the input member is configured to drive axial movement of the linkage through the thrust bearing and the contact member.

16. The clamping device of claim 9, wherein the abutment surface has a wall extending from the abutment surface toward the rear side of the primary member to define a cup-shape receiving the front side of the primary member.

17. The clamping device of claim 9, wherein the clamping member comprises a substantially annular body that extends from a first end peripherally around the central passage of the primary member to a second end, and wherein the actuator mechanism is configured to engage the clamping member to move the first and second ends closer together in the locked position, thereby narrowing the inner width of the clamping member, and farther apart in the unlocked position, thereby widening the inner width of the clamping member.

18. An assembly comprising the clamping device of claim 9, wherein the clamping device is a barbell clamp, and further comprising the mounting member in the form of a barbell and a weight plate mounted on the barbell, the weight plate defining the surface, wherein the clamping device is mounted on the barbell such that a portion of the barbell extends through the central passage, and the abutment surface abuts the surface of the weight plate.

19. The clamping device of claim 9, wherein the abutment member extends completely around the first opening.

20. The clamping device of claim 9, wherein the passage through which the linkage extends is a hole with a periphery defined entirely within the body of the primary member.

21. A clamping device comprising:
a primary member comprising a body having a central passage extending in an axial direction and configured for receiving a mounting member therethrough;
a clamping member disposed within the central passage of the primary member and having an inner surface extending around at least a portion of the central passage and defining an inner width, wherein the clamping member is configured for selectively engaging the mounting member by widening or narrowing the inner width of the clamping member when the mounting member is received in the central passage; and
an engagement mechanism configured to engage a surface adjacent to the primary member, the engagement mechanism comprising:
an abutment member having a first opening configured to receive the mounting member therethrough, and positioned at a front side of the primary member and configured to move along the axial direction with respect to the primary member and having an abutment surface configured to confront the surface;
an input member having a second opening configured to receive the mounting member therethrough, and threadably engaged with the primary member and positioned at a rear side of the primary member spaced from the abutment member in the axial direction, wherein the input member is configured to move along the axial direction with respect to the primary member by rotation with respect to the primary member via the threadable engagement;
a linkage extending in the axial direction through a passage extending through the body of the primary member and operably engaging the abutment member and the input member such that the abutment member, the linkage, and the input member move together along the axial direction, wherein movement of the input member along the axial direction by rotation is configured to move the linkage in the axial direction to drive movement of the abutment member in the axial direction toward the surface to cause the abutment surface to abut the surface.

22. The clamping device of claim 21, wherein the input member comprises a body having a cylindrical wall defining a receiver that receives a portion of the primary member, and wherein an inner surface of the cylindrical wall and an outer surface of the primary member have complementary threading to threadably engage the input member with the primary member.

23. The clamping device of claim 21, further comprising a biasing member engaged with the engagement mechanism and configured to bias the abutment member in the axial direction toward the front side of the primary member.

24. The clamping device of claim 21, wherein the passage extends completely through the body of the primary member, from the front side to the rear side.

25. The clamping device of claim 21, further comprising a plurality of linkages, including the linkage, each of the plurality of linkages operably engaging the abutment member and the input member, wherein movement of the input member along the axial direction by rotation is configured to move the plurality of linkages in the axial direction to drive movement of the abutment member in the axial direction toward the surface.

26. The clamping device of claim 21, wherein the engagement mechanism further comprises a contact member engaging the linkage and a thrust bearing engaging the contact member and the input member, wherein rotational movement of the input member is configured to drive axial movement of the linkage through the thrust bearing and the contact member.

27. An assembly comprising the clamping device of claim 21, wherein the clamping device is a barbell clamp, and further comprising the mounting member in the form of a barbell and a weight plate mounted on the barbell, the weight plate defining the surface, wherein the clamping device is mounted on the barbell such that a portion of the barbell extends through the central passage, and the abutment surface abuts the surface of the weight plate.

28. The clamping device of claim 21, wherein the abutment member extends completely around the first opening.

29. The clamping device of claim 21, wherein the passage through which the linkage extends is a hole with a periphery defined entirely within the body of the primary member.

* * * * *